United States Patent [19]

Igarashi et al.

[11] Patent Number: 5,539,466
[45] Date of Patent: Jul. 23, 1996

[54] EFFICIENT CODING APPARATUS FOR PICTURE SIGNAL AND DECODING APPARATUS THEREFOR

[75] Inventors: Katsuji Igarashi; Tomoyuki Sato, both of Tokyo, Japan

[73] Assignee: Sony Corporation, Tokyo, Japan

[21] Appl. No.: 312,434

[22] Filed: Sep. 26, 1994

Related U.S. Application Data

[63] Continuation of Ser. No. 30,019, filed as PCT/JP92/00956, Jul. 28, 1992 published as WO93/03578, Feb. 18, 1993, abandoned.

[30] Foreign Application Priority Data

Jul. 30, 1991 [JP] Japan ..................... 3-211382
Dec. 19, 1991 [JP] Japan ..................... 3-353990
Dec. 27, 1991 [JP] Japan ..................... 3-358184

[51] Int. Cl.⁶ ..................................... H04N 7/50
[52] U.S. Cl. .................... 348/401; 348/404; 348/412
[58] Field of Search ........................... 348/411, 412, 348/413, 414, 415, 416, 409, 407, 404, 403, 402, 401, 400, 390, 384

[56] References Cited

U.S. PATENT DOCUMENTS

| | | | |
|---|---|---|---|
| 4,217,609 | 8/1980 | Hatori et al. ................. | 348/412 |
| 4,437,119 | 3/1984 | Matsumoto et al. .......... | 348/412 |
| 4,546,386 | 10/1985 | Matsumoto et al. .......... | 348/412 |
| 4,571,618 | 2/1986 | Hatori et al. ................. | 348/412 |
| 4,849,812 | 7/1989 | Borgers et al. . | |
| 5,025,482 | 6/1991 | Murakami et al. ........... | 348/416 |
| 5,091,782 | 2/1992 | Krause et al. ................ | 348/400 |
| 5,093,720 | 3/1992 | Krause et al. ................ | 348/413 |
| 5,168,357 | 12/1992 | Kutka . | |
| 5,175,618 | 12/1992 | Ueda et al. ................... | 348/416 |
| 5,351,086 | 9/1994 | Park ............................. | 348/402 |
| 5,355,378 | 10/1994 | Ohta ............................. | 348/413 |

FOREIGN PATENT DOCUMENTS

| | | |
|---|---|---|
| 0490799 | 6/1992 | European Pat. Off. . |
| 59-128881 | 7/1984 | Japan . |
| WO90/15506 | 12/1990 | WIPO . |

*Primary Examiner*—Tommy P. Chin
*Assistant Examiner*—Bryan S. Tung
*Attorney, Agent, or Firm*—William S. Frommer; Alvin Sinderbrand

[57] ABSTRACT

An apparatus for coding a moving picture in which one frame is comprised of two fields, includes a coder such that, with respect to all blocks in a frame, the odd field (the first field) and the even field (second field) are divided into blocks, thus permitting motion prediction of the second field from the first field, a coder means adapted for switching, every macro block, whether or not a frame is divided into the first field and the second field to generate block data to adaptively switch these coders every frame, thereby making it possible to obtain a picture of a high picture quality with a lesser quantity of information, to reduce the scale of hardware, and to reduce the capacity of a decoder.

1 Claim, 19 Drawing Sheets

| Y0 | Y1 |
|---|---|
| Cb01 | Cr01 |
| Y2 | Y3 |
| Cb23 | Cb23 |

FRAME ORTHOGONAL
TRANSFORM MODE

FIG. 13A

| Y02o | Y13o |
|---|---|
| Cb0123o | Cr0123o |
| Y02e | Y13e |
| Cb0123e | Cr0123e |

FIELD ORTHOGONAL
TRANSFORM MODE

FIG. 13B

| | j=0 | 1 | 2 | 3 | 4 | |
|---|---|---|---|---|---|---|
| i=0 → | MB(i,j) | MB(i,j+1) | - - - | - - - | - - | → |
| 1 → | MB(i+1,j) | MB(i+1,j+1) | - - - | - - - | - - | → |
| 2 → | ' | ' | | | | → |
| 3 | ' | ' | | | | |
| | ' | ' | | | | |

FIG. 14

EFFICIENT CODING APPARATUS FOR PICTURE SIGNAL AND DECODING APPARATUS THEREFOR

This application is a continuation of application Ser. No. 08/030,019, filed as PCT/JP92/00956, Jul. 28, 1992 published as WO93/03578, Feb. 18, 1993, now abandoned.

TECHNICAL FIELD

This invention relates to an efficient coding apparatus for a picture signal, which is adapted to efficiently encode a picture signal by the orthogonal transform processing.

BACKGROUND ART

As a system for efficiently encoding a picture signal, e.g., in the standardized scheme by the MPEG (Moving Picture Experts Group), an efficient coding system for a picture signal for use in so called digital storage media is standardized.

Here, storage media subject to this system are media having a continuous transfer rate (speed) of about 1.5M bps. (bits per second) such as a so called CD (Compact Disk), a DAT (Digital Audio Tape Recorder), or a hard, disk, etc. These media are not only directly connected to a decoder, but also are assumed to be connected thereto through transmission media such as a bus of a computer, a LAN (Local Area Network), or a telecommunication link, etc. Further, not only reproduction in forward direction, but also special functions such as random access, high speed reproduction, or reproduction in backward direction, etc. are taken into consideration.

The principle of the efficient coding system for a picture signal by the MPEG is as referred to below.

Namely, in this efficient coding system, a difference between pictures (frames) is first taken to thereby reduce the redundancy in the time base direction thereafter to reduce the redundancy in the spatial base direction by using a so called Discrete Cosine Transform (DCT) processing and variable length coding.

The redundancy in the time base direction will be first described below.

Generally, in successive moving pictures, a certain picture remarked (i.e., a picture at a certain time) and pictures before and after that picture are considerably similar to each other.

For this reason, as shown in FIG. 22, for example, if an approach is employed to take a difference between a picture to be coded from now on and a picture forward in time to transmit that difference, the redundancy in the time base direction can be reduced to lessen a quantity of information transmitted.

A picture coded in this way is called a Predictive-Coded Picture (P picture or P frame) which will be described later.

Similarly, if an approach is employed to take a difference between the picture to be coded from now on and a picture prepared forward or backward in time, and a difference between the picture to be coded from now on and an interpolated picture prepared by pictures forward and backward in time to transmit a difference of a smaller value of those differences, the redundancy in the time base direction can be reduced to lessen a quantity of information transmitted.

A picture coded in this way is called a Bidirectionally Predictive-coded picture (B picture or B frame) which will be described later.

In FIG. 22, a picture represented by I indicates an Intra-coded picture (I picture or I frame) which will be described later, a picture indicated by P indicates the above-mentioned P picture, and a picture indicated by B indicates the above-mentioned B picture.

In order to prepare respective predictive pictures, so called motion compensation is carried out.

Namely, in accordance with this motion compensation, e.g., a block of 16×16 pixels (hereinafter called a macro block) comprised of, e.g., unit blocks of 8×8 pixels is prepared to search a macro block in which a difference is minimum in the vicinity of the position of the macro block of a former picture to take a difference between the macro block and the searched macro block, thereby making it possible to reduce a quantity of data to be transmitted.

Actually, for example, in the P picture (Predictive-coded picture), picture data having a lesser quantity of data of a picture in which a difference between a picture to be coded from now on and a motion-compensated predictive picture is taken and a picture in which a difference between the picture to be coded from now on and the motion-compensated predictive picture is not taken is selected every macro block of 16×16 pixels, and the selected picture data is then coded.

However, in cases as described above, many data must be transmitted with respect to, e.g., the portion (picture) appearing from behind the portion where an object moves.

In view of this, for example, in the B picture (Bidirectionally Predictive-coded picture), there is coded picture data in which the quantity of data is the smallest of four picture data i.e., a difference between an already decoded motion compensated picture forward in time and the picture to be coded from now on; a difference between an already decoded motion compensated picture backward in time and the picture to be coded from now on; a difference between an interpolated picture prepared by the both pictures forward and backward in time and the picture to be coded from now on; and a picture in which a difference is not taken, i.e., the picture to be coded from now on.

The redundancy in the spatial base direction will now be described.

A difference of picture data is caused to undergo Discrete Cosine Transform (DCT) processing every unit block of 8×8 pixels without adopting an approach to transmit such a difference as it is.

In this DCT processing, a picture is not represented by the pixel level, but is represented by to what degree respective frequency components of a cosine function are included. For example, by the two-dimensional DCT processing, data of unit blocks of 8×8 pixels are transformed to data of coefficient blocks of 8×8 pixels of components of a cosine function.

There are many instances where a picture signal of a natural picture as imaged by a television camera becomes a smooth signal. In this instance, the above-mentioned DCT processing is implemented to the picture signal, thereby making it possible to reduce a quantity of data.

Namely, for example, in the case of a smooth signal like a picture signal of a natural picture as described above, the DCT processing is implemented thereto, whereby large values concentrate on values in the vicinity of a certain coefficient.

When this coefficient is quantized, most of coefficient values of the DCT coefficient block of 8×8 become equal to zero, so only large coefficient values are left.

In transmitting data of coefficient block of 8×8, an approach is employed to transmit such data, in order of so called a zigzag scan, by using so called a Huffman codes in which a non-zero coefficient and so called zero-run indicating how many number of zeros continue before that coefficient are combined as each set, thereby making it possible to reduce a quantity of data transmitted.

On the decoder side, a picture is reconstructed by a procedure opposite to the above.

The structure of data handled by the above-described coding system is shown in FIG. 23.

Namely, data structure shown in FIG. 23 is comprised of a block layer, a macro block layer, a slice layer, a picture layer, a Group of Picture (GOP) layer, and a video sequence layer in order from the bottom. Explanation will now be described in order from a lower layer in FIG. 23.

In the block layer, each block of this block layer is comprised of luminance or color difference adjacent 8×8 pixels (pixels of 8 lines×8 pixels).

The above-described DCT (Discrete Cosine Transform) processing is applied every unit block.

In the above-mentioned macro block layer, each macro block of the macro block layer is comprised of six blocks in total of four luminance blocks (unit blocks of luminance) Y0, Y1, Y2, Y3 adjacent in left and right directions and in upper and lower directions, and color difference blocks (unit blocks of color difference) Cr, Cb existing correspondingly at the same positions as those of the luminance blocks on a picture.

These blocks are transmitted in order of Y0, Y1, Y2, Y3, Cr and Cb.

In this coding system, what picture is used for a predictive picture (a reference picture for taking a difference), or whether or not there is a need to transmit a difference is judged every macro block.

The above-mentioned slice layer is comprised of one or plural macro blocks successive in order of scanning of a picture.

At the header of this slice layer, differences between respective motion vectors in a picture and a DC (Direct Current) component are reset. The first micro block has data indicating position in a picture. Accordingly, even in the case where an error takes place, data can be restored to a normal state every slice.

For this reason, the length and starting position of the slice are arbitrary, and can be changed in dependency upon an error state of a transmission path.

In the above-mentioned picture layer, a picture, i.e., each frame is comprised of at least one or plural slices mentioned above. These pictures are respectively classified into four kinds of pictures of the Intra-coded picture (I picture or I frame), the Predictive-coded picture (P picture or P frame), the Bidirectional predictive-coded picture (B picture or B frame), and DC intra coded picture.

In the intra coded picture (I picture), when a picture is coded, information only within that picture is used.

In other words, at the time of decoding, a picture can be reconstructed only by information of the I picture itself. In actual terms, a picture is caused to undergo DCT processing as it is without taking a difference, and the picture thus processed is then coded.

Although this coding system has a poor efficiency in general, if such I pictures are inserted at suitable portions, random access or high speed reproduction can be made.

In the above-mentioned Predictive coded picture (P picture), an I picture or a P picture, which is positioned forward in time in terms of input sequence and has been already decoded, is used as a predictive picture (a picture serving as a reference in taking a difference).

Actually, any one of a higher efficiency of the method of coding a difference between a picture to be coded from now on and a motion compensated predictive picture and the method of coding a picture as it is without taking a difference therebetween (intra coding) is selected every macro block.

In the above-mentioned Bidirectional predictive coded picture (B picture), three kinds of pictures of an I picture and a P picture which are positioned forward in time and have been already decoded, and an interpolated pictures prepared from the both pictures are used as a predictive picture.

Thus, a picture having the highest efficiency of the three kinds of motion compensated coded pictures of difference and the intra-coded picture can be selected every macro block.

The DC intra-coded picture is an intra coded picture comprised of only DC coefficients of DCT, and therefore cannot exist in the same sequence as that of other three kinds of pictures.

The above-mentioned Group Of Picture (GOP) layer is comprised of only one or plural I pictures, or one or plural I pictures and plural non-I pictures. When the order of inputting to an encoder is assumed to be, e.g., 1T, 2B, 3B, 4P*5B, 6B, 7I, 8B, 9B, 10I, 11B, 12B, 13P, 14B, 15B, 16P*17B, 18B, 19I, 20B, 21B, and 22P, an output of the encoder, i.e., an input of a decoder is, e.g., 1I, 4P, 2B, 3B*7I, 5B, 6B, 10I, 8B, 9B, 13P, 11B, 12B, 16P, 14B, 15B*19I, 17B, 18B, 22P, 20B, and 21B.

The reason why exchange of the order is carried out in the encoder in this way is that in the case where, e.g. , the B picture is coded or decoded, the I picture or the P picture backward in time serving as a predictive picture of the B picture must be coded in advance.

In this case, the interval (e.g., 9) of the I picture, and the interval (e.g., 3) of the P picture or the B picture are arbitrary.

Further, the interval of the I picture or P picture may be changed in the Group Of Picture layer.

It is to be noted that the connecting portion of the Group Of Picture layer is indicated by asterisk (*).

In FIG. 23 reference symbols I, P and B indicate I picture, P picture and B picture, respectively.

The above-mentioned video sequence layer is comprised of one or plural Group Of Picture layers in which the picture size and the picture rate, etc. are the same.

As described above, in the case of transmitting a moving picture standardized in accordance with the efficient, coding system by the MPEG, picture data obtained by compressing one frame (picture) in a picture is first, sent, and data of a difference between that picture and a picture obtained by implementing motion-compensation thereto is then transmitted.

Meanwhile, in the case of processing, e.g., a field as a picture in the above-mentioned one frame (picture), vertical positions vary interchangeably at respective 2 fields. For this reason, also at the time of transmitting, e.g., a still picture, difference information will have to be transmitted.

Further, for example, in the case of processing, with a picture being as a unit, a frame obtained by processing fields as a picture, a picture moved in so called a comb shape will have been processed with respect to, e.g., a moving portion in the frame.

Namely, in the case where a moving body CA such as an automotive vehicle, etc. exists on this side of a still background as shown in FIG. 24, for example, since there is motion (movement) between fields when attention is drawn to one frame, such a portion would be a picture in a comb form KS.

Further, in the case of processing a picture in which, e.g., still or stationary portions and moving picture portions are mixed, even if there is employed any one of the method of processing field as a picture and the method of processing frame as a picture, a picture portion having a poor compression efficiency would be in the picture.

This invention has been proposed in view of actual circumstances as described above, and its object is to provide an efficient coding apparatus for a picture signal, which is capable of efficiently carrying out the field processing or the frame processing even if a picture to be coded is a picture having small movement or great movement, or a picture in which those pictures are mixed with respect to a picture of the field structure.

DISCLOSURE OF THE INVENTION

To solve such problems, a first efficient coding apparatus according to this invention is directed to an efficient coding apparatus for a picture signal, which is adapted to carry out coding with a macro block comprised of a two-dimensional arrangement of a plurality of pixels being as a unit, comprising: motion detection means comprised of means for detecting, every macro block, motion vectors between frames and a sum of differences between absolute values of respective pixels, and means for detecting, every macro block, motion vectors between fields obtained by dividing the frame in dependency upon odd or even scans of pixels and a sum of differences between absolute values of respective pixels; first mode selection means for judging, by using information outputted from the motion detection means, which any one of a frame prediction mode for carrying out motion compensation with a frame comprised of the macro blocks being as a unit and a field predictive mode for carrying out motion compensation with a field comprised of the macro blocks being as a unit has a higher efficiency in carrying out motion compensation, thus to select a prediction mode of a higher efficiency; second mode selection means for judging, by using information outputted from the motion detection means and the first mode selection means, which any one of a frame orthogonal transform mode for transforming input picture data to block data so as to carry out orthogonal transform processing with a frame comprised of the macro blocks being as a unit and a field processing mode for transforming input picture data to block data so as to carry out orthogonal transform processing with a field comprised of the macro blocks being as a unit has a higher efficiency in carrying out orthogonal transform processing, thus to select a mode for generating block data of a higher efficiency; address generation means for recognizing whether a current cycle is an odd cycle of a time period during which scan of odd fields in an interlaced scan of coding processing or an even cycle of a time period during which scan of even fields in that interlaced scan is carried out with respect to one frame, thus to control a group of frame memories so as to output macro block data generated in correspondence with the selected mode for generating block data in the odd cycle; and motion compensation means adapted to receive the motion prediction mode information selected by the first mode selection means and the block data generation mode information selected by the second mode selection means to execute a motion compensation interframe or interfield prediction in correspondence with the mode information.

A second efficient coding apparatus is directed to an efficient coding apparatus for a picture signal, which is adapted to carry out coding with a macro block comprised of a two-dimensional arrangement of a plurality of pixels being as a unit, comprising: motion detection means comprised of means for detecting, every macro block, motion vectors between frames and a sum of differences between absolute value of respective pixels, and means for detecting, every macro block, motion vectors between fields by dividing the frame in dependency upon odd or even scans of pixels, and a sum of differences between absolute values of respective pixels; first mode selection means for judging, by using information outputted from the motion detection means, which any one of a frame prediction mode for carrying out motion compensation with a frame comprised of the macro block being as a unit and a field prediction mode for carrying out motion compensation with a field comprised of the macro blocks being as a unit has a higher efficiency in carrying out motion compensation, thus to select a prediction mode of a higher efficiency; second mode selection means for judging, by using information outputted from the motion detection means and the first mode selection means, which any one of a frame orthogonal transform mode for transforming input picture data to block data so as to carry out orthogonal transform processing with a frame comprised of the macro blocks being as a unit and a field processing mode for transforming input picture data to block data so as to carry out orthogonal transform processing with a field comprised of macro blocks being as a unit has a higher efficiency in carrying out orthogonal transform processing, thus to select a mode for generating block data of a higher efficiency; address generation means for recognizing whether a current cycle is an odd cycle of a time period during which scan of odd fields in an interlaced scan of coding processing, or an even cycle of a time period during which scan of even fields is carried out with respect to one frame, thus to control a group of frame memories so to sequentially output, by one frame, odd fields of respective macro blocks in the odd cycle only when the block data generation mode is the field processing mode, thereafter to sequentially output, by one frame, even fields of respective macro blocks in the even cycle; and motion compensation means adapted to receive motion prediction mode information selected by the first mode selection means and block data generation mode information selected by the second mode selection means to execute a motion in compensation interframe or interfield prediction correspondence with the mode information.

Further, an efficient decoding apparatus according to this invention comprises inverse variable length coding means adapted for receiving and decoding coded data to be reproduced and header information, thus to output detected motion vector information, motion predictive mode information, block data generation mode information, and macro block address increment data in header information of macro block data; address generation means adapted for calculating an address increment value in a frame buffer from the macro block address increment data to determine leading addresses of respective macro blocks to deliver those leading addresses to the frame buffer; and motion compensation means adapted for applying relative addresses of the macro blocks except for the leading addresses to the frame buffer to provide an access of data therein to receive the detected motion vector, the motion prediction mode information, and the block data generation mode information to execute a motion compensation interframe or interfield prediction corresponding to the mode information, thus to send a motion compensated picture signal to the frame buffer.

In addition, an efficient coding apparatus according to this invention is directed to an efficient coding apparatus for a picture signal, which is adapted to carry out coding with a macro block comprised of a two-dimensional arrangement of a plurality of pixels being as a unit, comprising: motion detection means comprised of means for detecting, every macro block, motion vectors between frames and a sum of differences between absolute value of respective pixels, and means for detecting, every macro block, motion vectors between fields obtained by dividing the frame in dependency upon odd or even scans of pixels and a sum of differences between absolute values of respective pixels; first mode selection means for judging, by using information outputted from the motion detection means, which any one of a frame prediction mode for carrying out motion compensation with a frame comprised of the macro blocks being as a unit and a field predictive mode for carrying out motion compensation with a field comprised of the macro blocks being as a unit has a higher efficiency in carrying out motion compensation, thus to select a prediction mode of a higher efficiency; second mode selection means for judging, by using information outputted from the motion detection means and the first mode selection means, which any one of a frame processing mode for transforming input picture data to block data so as to carry out orthogonal transform processing with a frame comprised of the macro blocks being as a unit and a field processing mode for transforming input picture data to block data so as to carry out orthogonal transform processing with a field comprised of the macro blocks being as a unit has a higher efficiency in carrying out orthogonal transform processing, thus to select a mode for generating block data of a higher efficiency; third mode selection means adapted for judging which any one of a first coding processing mode for adaptively switching the mode for generating block data, every respective macro blocks in one frame, into the frame processing mode or the field processing mode to encode respective macro block data on the basis of the respective modes and a second coding processing mode for carrying out, in the field processing mode, generation of block data in all macro blocks in one frame to encode, by one frame, only odd fields comprised of the macro blocks in an odd cycle of a time period during which scan of odd fields in an interlaced scan is carried out thereafter to encode, by one frame, even fields comprised of the macro blocks in the even cycle of a time period during which scan of even fields in the interlaced scan is carried out has a higher efficiency in coding, thus to select a coding processing mode of a higher efficiency; address generation means for recognizing that a current cycle is the odd cycle or the even cycle, whereby when the coding processing mode is the first coding processing mode, the address generation means control a group of frame memories so as to output macro block data generated in correspondence with the block data generation mode in the odd cycle, while when the coding processing mode is the second coding processing mode, the address generation means controls the group of frame memories so as to output macro block data generated in correspondence with the field processing mode in the odd cycle and the even cycle; and motion compensation means adapted to receive motion prediction mode information selected by the first mode selection means and block data generation mode information selected by the second mode selection means, thus to execute a motion compensation interframe or interfield prediction in correspondence with the mode information.

In other words, the efficient coding apparatus of this invention is characterized, in coding processing of a moving picture in which one frame is comprised of two fields, by the provision of coding means (second coding processing mode) such that, with respect to all blocks in a picture (frame), the odd field (first fields) and the even field (second field) are divided into blocks, thus permitting prediction of movement (motion) of the second field from the first field, and coding means (first coding processing mode) for switching every macro block whether or not a frame is divided into the first field and the second field to generate block data, thus to adaptively switch these coding means every frame.

In this case, information of one bit indicating these coding means (information indicating a selected mode) is added to a transmission code.

Further, the efficient decoding apparatus of this invention comprises inverse variable length coding means adapted to receive and decode coded picture data to be reproduced and header information including detected motion vector information, motion prediction mode information, block data generation mode information, and coding processing mode information to output, along with the decoded picture data, the detected motion vector information, the motion predictive mode information, the block data generation mode information, and the coding processing mode information which have been decoded; address generation means for calculating, from the coding processing mode information, an address increment value at a frame buffer for storing the decoded picture data to determine leading addresses of respective macro blocks, thus to deliver these leading addresses to the frame buffer; and motion compensation means for applying, to the frame buffer, relative addresses of the macro blocks except for the leading addresses to provide an access of data therein to receive the detected motion vector information, the motion prediction mode information, the block data generation mode information, and the coding processing mode information to execute motion compensation corresponding to the mode information, thus to send a motion-compensated picture signal to the frame buffer.

In accordance with the coding apparatus of this invention, switching between the frame orthogonal transform mode and the field orthogonal transform mode can be carried out every macro block. Accordingly, it is possible to select a coding processing of the highest efficiency every macro block.

Moreover, in accordance with the decoding apparatus of this invention, processing of one frame is divided into two cycles of an odd cycle and an even cycle. In the odd cycle, switching between the frame orthogonal transform mode and the field orthogonal transform mode is carried out every macro block. In the frame processing, odd fields and even fields are both decoded. On the other hand, in the field processing, only odd fields are decoded. Further, a quantization width in this cycle is stored. In the subsequent even cycle, this stored information is used to motion-compensate only macro block data in the field orthogonal transform mode to decode a reproduced picture. For this reason, on the coding apparatus side, coded data of a higher efficiency can be transmitted. Namely, it is possible to reproduce a picture of a high picture quality with a lesser quantity of information transmitted.

Further, in accordance with the coding apparatus of this invention, switching between the first coding processing mode and the second coding processing mode can be carried out every macro block. In the first coding processing mode, an approach is employed to adaptively select any one of the frame processing mode and the field processing mode, e.g., in dependency upon a quantity of movements of a picture, thereby making it possible to carry out an efficient coding.

In the second coding processing mode, generation of block data of all macro blocks in a frame is carried out in the field processing mode, thereby making it possible to carry out prediction of movement of the even field from the odd field with respect to, e.g., a frame in which there is a particularly great movement. Thus, a moving picture can be efficiently coded.

Further, in accordance with the efficient coding apparatus for a picture signal of this invention, even if, with respect to a moving picture of the field structure, a picture to be coded is a picture in which there is small movement or a picture in which there is great movement, or a picture in which both pictures are mixed, the field processing or the frame processing can be efficiently carried out. Accordingly, with a lesser quantity of information transmitted, it is possible to reproduce a moving picture of a high picture quality in decoding in the efficient decoding apparatus of this invention which will be described later in detail.

In addition, in accordance with the decoding apparatus of this invention, an approach is employed to carry out, every macro block, switching between the frame orthogonal transform mode and the field orthogonal transform mode in dependency upon the first or second coding processing mode, and to also carry out switching between the frame motion prediction mode and the field motion prediction mode to both decode odd fields and even fields in the frame processing to decode only odd fields in the field processing, and to store a quantization width in this cycle to motion-compensate only macro block data in the field orthogonal transform mode by using that stored information in the subsequent even cycle, thus to decode a reproduced picture. Thus, on the coding apparatus side, coded data having a higher efficiency can be transmitted. Namely, a moving picture of a high picture quality can be reproduced with a lesser quantity of information transmitted.

BRIEF DESCRIPTION OF THE DRAWINGS

FIG. 13 is a view showing a unit block of the DCT processing in the frame orthogonal transform mode/field orthogonal transform mode in another actual example of a format of a digital VTR.

FIG. 14 is a view showing a unit block of the DCT processing in the frame orthogonal transform mode/field orthogonal transform mode in a further actual example of a format of a digital VTR.

BEST MODE FOR CARRYING OUT THE INVENTION

Embodiments to which this invention is applied will now be described with reference to the attached drawings.

First, main flow of picture data subjected to coding processing in a first embodiment will be described by using the configuration of FIG. 1.

Next, second and third embodiments will be described with reference to FIGS. 2 and 3, respectively.

Further, a fourth embodiment will be described with reference to FIG. 18. Finally, an embodiment of the configuration of a decoder of this invention will be described with reference to FIG. 19.

Figure 4:
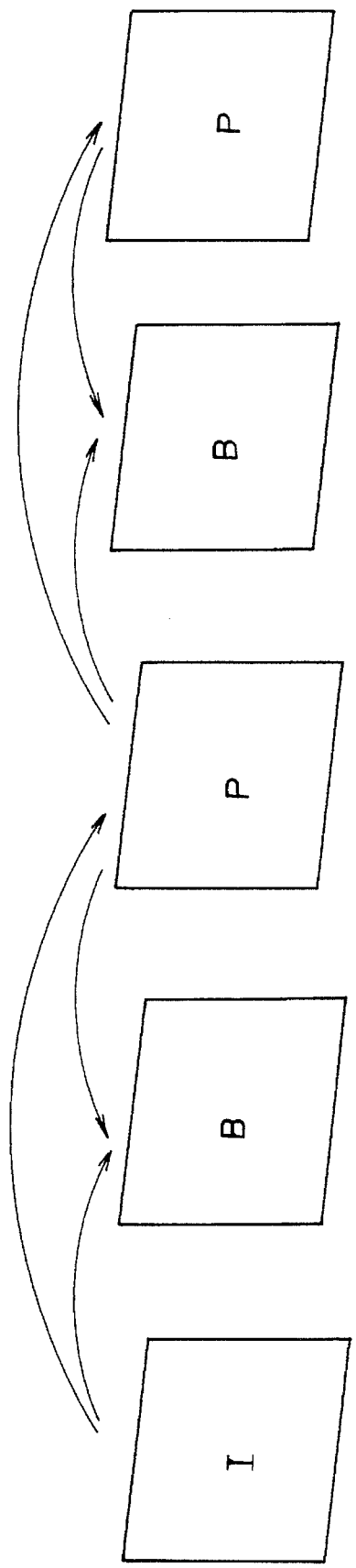
FIG. 4 is a view for explaining the coding processing of this embodiment.

It is to be noted that, in coding apparatuses of the embodiments, there may be carried out three kinds of coding processing of an Interframe coding (I frame or I picture) processing, a (unidirectional) Predictive interframe (interframe) coding (P frame or P picture) processing, and a Bidirectional interpicture coding (B frame or B picture) processing which are all as shown in FIG. 4. In addition, respective pictures are constituted as a block comprised of 8×8 pixels and each macro block is comprised of 2×2 blocks (i.e., 16×16 pixels).

Description of the First Embodiment

Figure 1:
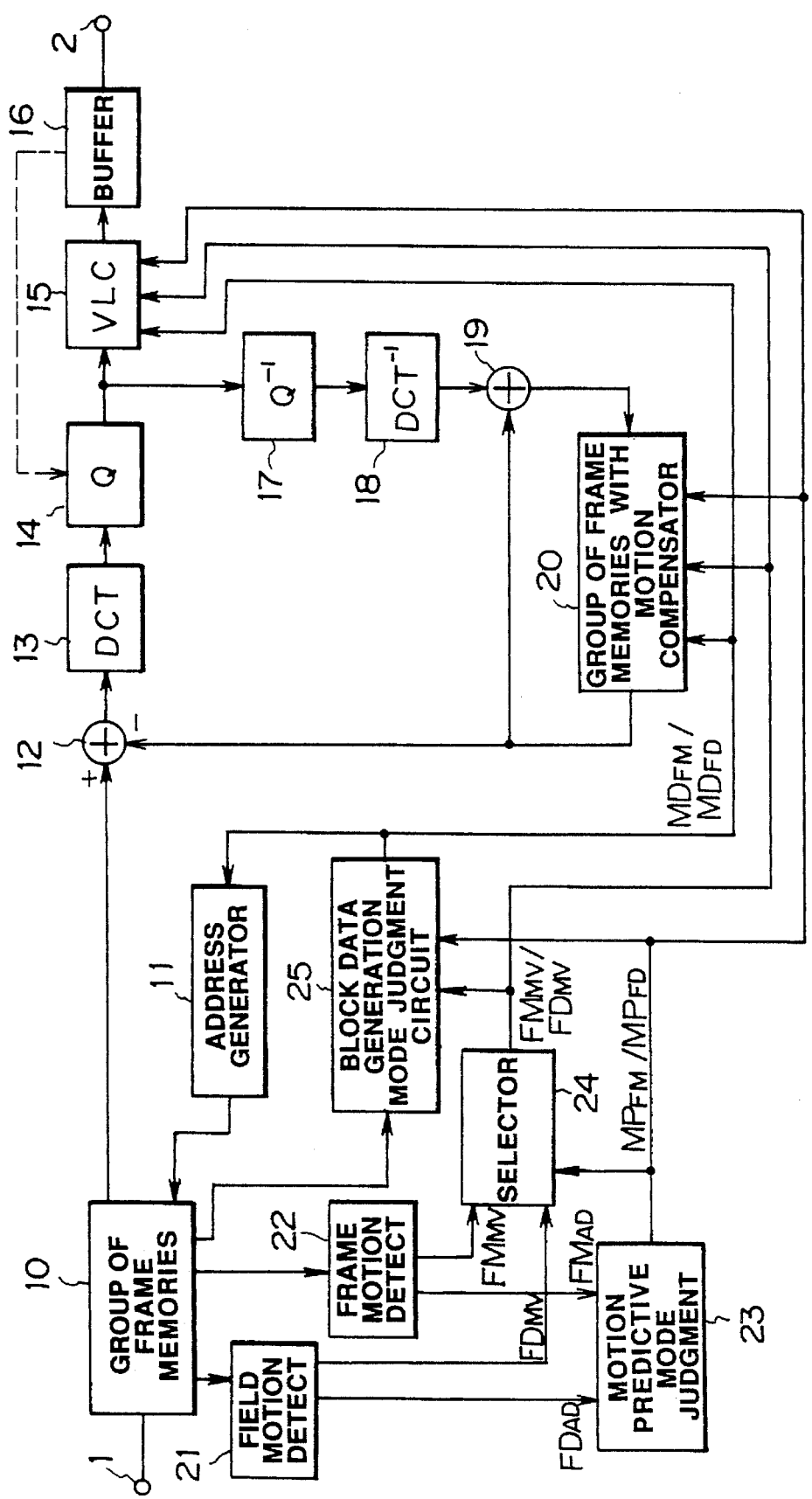
FIG. 1 is a block diagram showing the outline of the configuration of an efficient coding apparatus for a picture signal of a first embodiment.

FIG. 1 shows a first embodiment of an efficient coding apparatus for a picture signal, which is adapted to carry out coding with a macro block comprised of a two-dimensional arrangement of pixels which is smaller than one picture (e.g., a block in which 16×16 pixels in a spatial arrangement of input picture data in order of a raster scan are assumed as a unit block) being as a unit.

This efficient coding apparatus comprises the following components.

Namely, the efficient coding apparatus comprises a group of frame memories 10 in which a plurality of frames (pictures) comprised of a plurality of unit blocks of 16×16 pixels are stored as an original picture, and a frame motion detection circuit 22 and a field motion detection circuit 21, which serve as motion detection means for detecting, every macro block, motion vectors between frames and a sum of differences of absolute values of respective pixels, and for detecting, every macro block, motion vectors between fields obtained by dividing a frame in dependency upon odd and even scans of pixels and a sum of differences between absolute values of pixels, respectively.

The efficient coding apparatus further comprises motion prediction mode judgment circuit 23 and a selector 24, which serve as first mode selection means for judging, by using information outputted from the motion detection means, which any one of a frame prediction mode for carrying out motion compensation with a frame comprised of the macro blocks being as a unit and a field prediction mode for carrying out motion compensation with a field comprised of the macro blocks being as a unit has a higher efficiency, thus to select a prediction mode of a higher efficiency.

The efficient coding apparatus further comprises a block data generation mode judgment circuit 25, serving as second mode selection means, which is adapted to judge, by using information outputted from the motion detection means and the first mode selection means, which any of one a frame orthogonal transform mode for transforming input picture data to block data so as to carry out orthogonal transform processing with a frame comprised of macro blocks being as a unit and a field orthogonal transform mode for transforming input picture data to block data so as to carry out orthogonal transform processing with a field comprised of macro blocks being as a unit has a higher efficiency in carrying out orthogonal transform processing, thus to select a block data generation mode of a higher efficiency.

The efficient coding apparatus further comprises an address generator 11 for recognizing whether a current cycle is an odd cycle of a time period during which scan of odd fields in an interlaced scan of the coding processing is carried out, or an even cycle of a time period during which scan of even fields in that interlaced scan is carried out with respect to one frame, thus to control the group of frame memories so as to output macro block data generated in correspondence with the block data generation mode in the odd cycle, and a group of frame memories 20 with a motion compensator, which serves as motion compensation means adapted to receive motion prediction mode information selected by the first mode means and block data generation mode information selected by the second mode selection means, thus to execute motion compensation interframe or interfield prediction in correspondence with the mode information.

Namely, in FIG. 1, a digital picture signal is delivered to an input terminal 1, and is then stored into the group of frame memories 10. From the group of frame memories 10, data of unit macro block of 16×16 pixels are read out under the control of the address generator 11 of which operation will be described later in detail. The data thus read out are transmitted to a subtracter 12. To the subtracter 12, motion compensated picture data from the group of frame memories 20 with motion compensator are also delivered. Each difference between the data of unit macro blocks and the motion-compensated picture data is detected at the subtracter 12.

An output of the subtracter 12 is sent to a DCT circuit 13 for carrying out orthogonal transform (DCT) processing. While DCT is shown as an example, other orthogonal transform processing such as FFT, etc. may be of course applied as the orthogonal transform processing.

DCT coefficient data obtained by DCT processing at the DCT circuit 13 is sent to a quantizer 14. Quantized data from the quantizer 14 is outputted as coded data from an output terminal 2 through a variable length encoder 15 for carrying out variable length coding processing, e.g., so called Huffman coding or run length coding, etc. and a buffer 16.

This coded data is not only transmitted through a predetermined communication path, but is also permitted to be written into recording media such as an optical disk or a magnetic tape, etc.

Further, the quantized data from the quantizer 14 is delivered to the group of frame memories 20 with motion compensator through an inverse quantizer 17 for carrying out inverse quantization processing of the quantization processing at the quantizer 14 and an inverse DCT circuit for carrying out inverse DCT processing of the DCT processing at the DCT circuit 13, and through an adder 19. At the adder 19, an output of the inverse DCT circuit 18 and an output of the group of frame memories 20 with motion compensator are added. It is to be noted that a signal for preventing an overflow of the buffer 16 is fed back from the buffer 16 to the quantizer 14 as indicated by dotted lines.

On the other hand, picture data outputted every macro block from the group of frame memories 10 is sent to the frame motion detector 22 and the field motion detector 21.

The field motion detector 21 detects, every macro block, motion vectors between fields and a sum of differences between absolute values of respective pixels, thus to output these data (data FDMV of the motion vectors between fields and data FDAD of the sum of the differences between absolute values).

Further, the frame motion detector 22 detects, every macro block, motion vectors between frames and a sum of differences between absolute values of respective pixels, thus to output these data (data FMMV of the motion vectors between frames and data FMAD of the sum of differences between absolute values).

Data FMMV/FDMV of respective motion vectors of these motion detection circuits 22 and 21 are transmitted to the selector 24, and data FMAD/FDAD of sums of differences between respective absolute values are transmitted to a prediction mode judgment circuit 23.

This motion prediction mode judgment circuit 23 carries out judgment whether the motion predictive processing is carried out every field, or the motion predictive processing is carried out every frame in the motion predictive processing at the group of frame memories 20 with motion compensator (of which operation will be described in detail later) on the basis of the data FDAD of the sum of differences between absolute values from the field motion detector 21 and the sum of differences between absolute values from the frame motion detector 22, thus to output data indicating a processing mode of a more advantageous processing (of a higher efficiency).

To speak in a practical manner, in the case where it is judged at the motion predictive mode judgment circuit 23 that, e.g., a difference between data FMAD of a sum of differences between absolute values and data FDAD of a sum of differences between absolute values is greater than a certain threshold value T1 (when FMAD–FDAD>T1), data indicating that the method of carrying out the motion predictive processing every field has a higher efficiency (data MPFD in the field orthogonal transform mode in the motion prediction) is outputted from the circuit 23.

In contrast, in the case where it is judged that a difference between data FMAD of a sum of differences between absolute values and data FDAD of a sum of differences between absolute values is smaller than the threshold value T1 or equal thereto (when FMAD–FDAD≦T1), data indicating that the method of carrying out the motion predictive processing every frame has a higher efficiency is outputted.

Any one of these motion predictive mode data MPFM/MPFD is sent to the group of frame memories 20 with motion compensator. Thus, the group of frame memories 20 carries out motion compensation every frame or every field. Further, any one of these motion predictive mode data MPFM/MPFD is also sent to the selector 24.

This selector 24 selectively outputs, in dependency upon the motion predictive mode data MPFM/MPFD from the motion predictive mode judgment circuit 23, either data FMMV of motion vectors between frames delivered from the frame motion detector 22 or data FDMV of motion vectors between fields delivered from the field motion detector 21. Namely, when the motion predictive mode data is data MPFD indicating the field predictive mode, the selector 24 selects and outputs motion vector data FDMV from the field motion detector 21, and when the motion predictive mode data is data MPFM indicating the frame predictive mode, the selector 24 selects and outputs motion vector data FMMV from the frame motion detector 22.

The motion vector data FMMV/FDMV is selected at the selector 24 is sent to the block data generation mode judgment circuit 25.

To the block data generation mode judgment circuit 25, output data from the group of frame memories 10 and the processing mode data MPFM/MPFD from the motion predictive mode judgment circuit 23 are also delivered. This block data generation mode judgment circuit 25 receives the motion predictive mode data MPFM/MPFD and the motion vector data FMMV/FDMV, and further prepares difference picture data by using picture data from the group of frame memories 10 to select, on the basis of the difference picture data, a block data generation mode most suitable for a picture which is outputted from the group of frame memories 10 and is subjected to DCT processing at the DCT circuit 13.

It is to be noted that, in the case of the I picture (or I frame), data of a picture (original picture) of the group of frame memories 10 is used in place of the difference picture data.

Figure 5A:
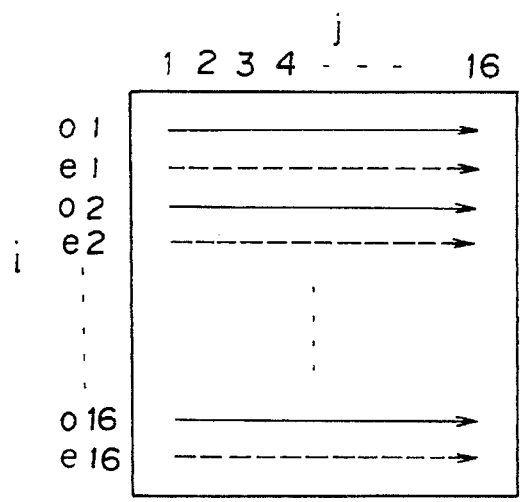
FIGS. 5(A), 5(B), and 5(C) are views showing a macro block.

Namely, it is now assumed that, e.g., a macro block of the difference picture is a macro block as shown in FIG. 5(A), for example (macro block of an original picture in the I picture).

In FIG. 5(A), odd lines (o1, o2, o3, . . . oN, N is equal to 16 in the case of the macro block) are indicated by solid lines, and even lines (e1, e2, e3, . . . eN, N is equal to 16 in the case of the macro block) are indicated by dotted lines. Further, respective pixels of even lines are represented by e(i,j), and respective pixels of odd lines are represented by o(i, j). In a difference picture or original picture (picture of the I picture) as shown in FIG. 5(A), a difference EFD of the difference picture every field can be expressed by the following formula (1), and the difference EFM of the difference picture every frame can be expressed by the following formula (2).

$$EFD = \sum_{j=1}^{16} \sum_{i=1}^{15} (|o(i,j) - o(i+1,j)| + |e(i,j) - e(i+1,j)|) \quad (1)$$

$$EFM = \sum_{j=1}^{16} \sum_{i=1}^{16} |o(i,j) - e(i,j)| + \sum_{j=1}^{16} \sum_{i=1}^{15} |e(i,j) - o(i+1,j)| \quad (2)$$

In actual terms, in the case where it is judged at the block data generation mode judgment circuit 25 that a difference between a difference EFM determined with respect to the frame and a difference EFD determined with respect to the field by using the above formulas (1) and (2) is greater than a certain threshold value T2 (when EFM–EFD>T2), this circuit 25 outputs data indicating that the DCT processing at the DCT circuit 13 is carried out every field (data MDFD in the field orthogonal transform mode in the block data generation processing). In contrast, in the case where it is judged that a difference between the difference EFM and the difference EFD is smaller than the threshold value T2 or is equal thereto (when EFM–EFD≦T2), the block data generation mode judgment circuit 25 outputs data indicating that the DCT processing at the DCT circuit 13 is carried out every frame (data MDFM in the frame orthogonal transform mode in the block data generation processing). Any one of these block data generation processing mode data MDFM/MDFD is transmitted to the address generator 11 and the group of frame memories 20 with motion compensator. Further, the motion vector data (FMMV/FDMV), the block data generation mode data (MDFM/MDFD), and the predictive mode data (MPFM/MPFD) are sent to the above-described variable length encoder 15.

The address generator 11 controls the group of frame memories 10 so as to output macro block data generated in dependency upon processing mode data MDFM/MDFD at the DCT circuit 13 every macro block, for example, with respect to picture data stored in the group of frame memories 10.

Figure 5B:
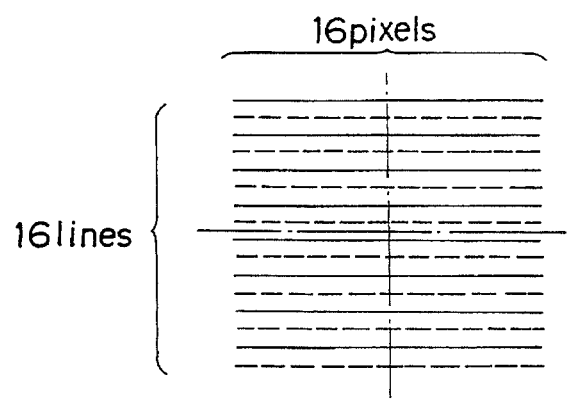

Namely, in the case where the block data generation mode data is data MDFM indicating DCT processing every frame, the address generator 11 controls the group of frame memories 10 so as to output macro block data in which even pixels and odd pixels are alternately arranged as shown in FIG. 5(B). Thus, unit block data of the macro block sent to the DCT circuit 13 are data in which even fields and odd fields are combined.

Figure 5C:
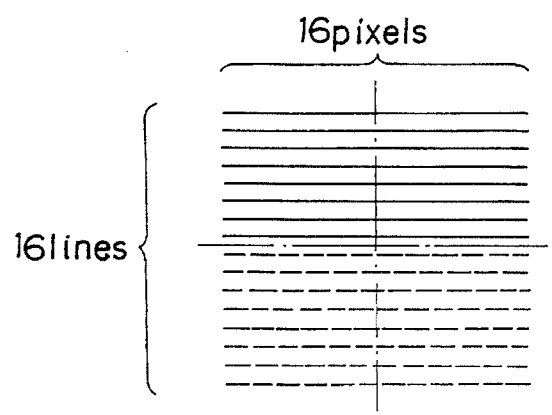

In contrast, in the case where the block data generation mode data is data MDFD indicating DCT processing every field, the address generator 11 controls the group of frame memories 10 so as to macro block data in which even pixels and odd pixels are separately arranged as shown in FIG. 5(C).

Thus, unit block data of the macro block sent to the DCT circuit 13 is data in which even fields and odd fields are separate with each other. It is to be noted that the DCT circuit 13 carries out DCT transform processing every unit block of 8×8 pixels as described above. In FIGS. 5(B) and 5(C), odd lines are indicated by solid lines, and even lines are indicated by dotted lines.

To the group of frame memories 20 with motion compensator, predictive mode data MPFM/MPFD from the motion predictive mode judgment circuit 23, processing mode data MDFM/MDFD from the DCT mode judgment circuit 25, and motion vector data FMMV/FDMV selected at the selector 24 are delivered. Accordingly, this group of frame memories 20 with motion compensator carries out motion compensation corresponding to the predictive mode data MPFM/MPFD in the motion prediction and block data generation mode data MDFM/MDFD in the DCT processing and using the motion vector data FMMV/FDMV.

Description of the Second Embodiment

Figure 2:
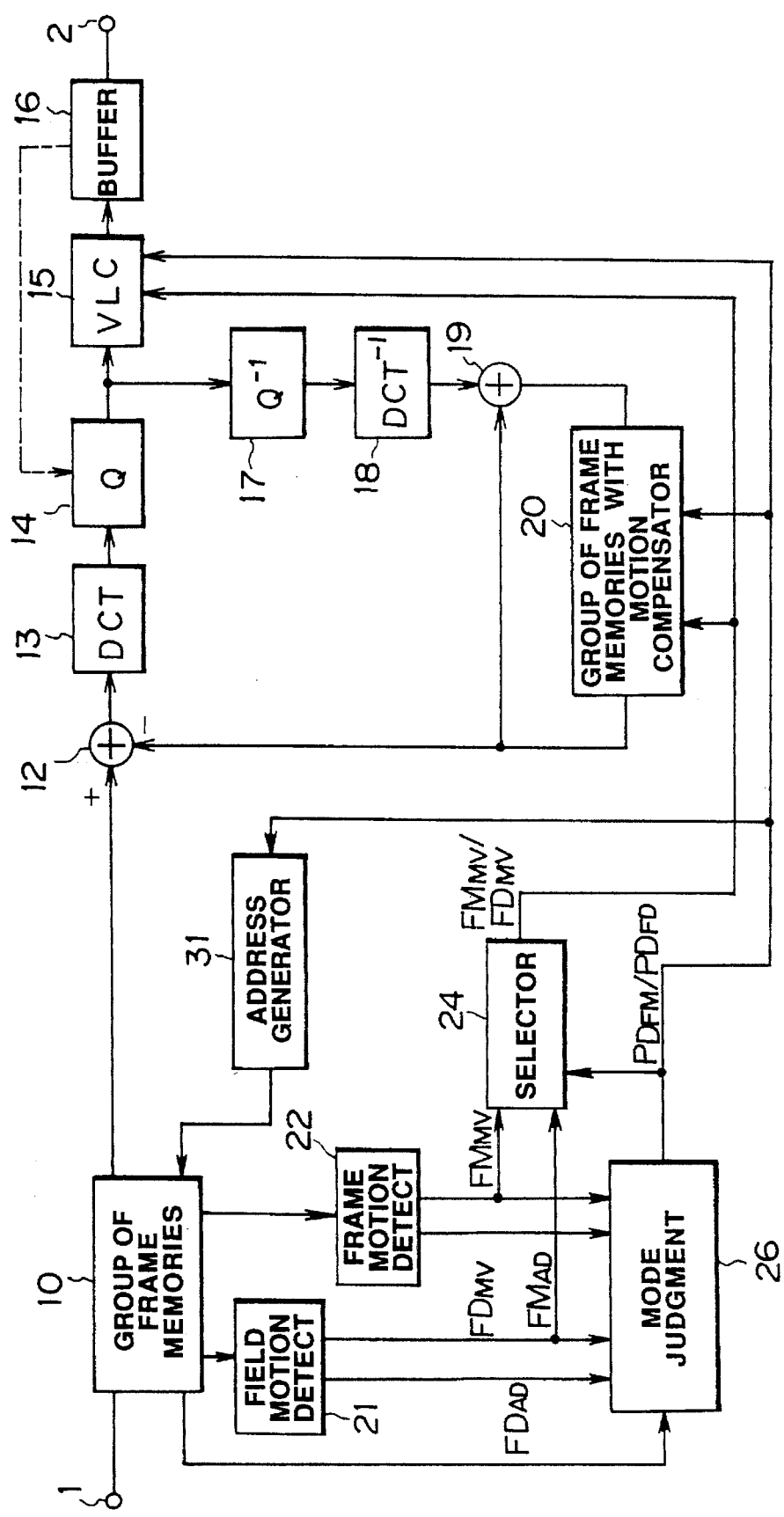
FIG. 2 is a block diagram showing the outline of the configuration of an efficient coding apparatus for a picture signal of a second embodiment.

FIG. 2 shows a second embodiment. In FIG. 2, blocks to which the same reference numerals as those of FIG. 1 are attached have the same functions, respectively. Accordingly, explanation will now be given in connection with to which reference numerals different from those of FIG. 1 are attached.

Namely, an efficient coding apparatus of FIG. 2 comprises, in addition to the blocks to which the same reference numerals as those of the efficient coding apparatus of FIG. 1 are attached, a mode judgment circuit 26 and a selector 24 which serve as mode selection means to judge, by using information outputted from the motion detection means, which any one of an efficiency in the case where the motion compensation is carried out in the frame prediction mode and block data generation for the orthogonal transform processing is carried out in the frame orthogonal transform mode, and an efficiency in the case where the motion compensation is carried out in the field predictive mode and block data generation for the orthogonal transform processing is carried out in the field orthogonal transform mode has a higher value, thus to select a predictive mode of a higher efficiency, and an address generator 31 serving as address generation means for recognizing whether a current cycle is an odd cycle of a time period during which scan of odd fields is carried out or an even cycle of a time period during which scan of even fields is carried out in an interlaced scan of the coding processing with respect to one frame (one picture), thus to control the group of frame memories so as to sequentially output, by one frame, odd fields of respective macro blocks in the odd cycle only when the mode of the mode judgment circuit 26 is field prediction/field processing mode thereafter to sequentially output, by one frame, even fields of respective macro blocks in the even cycle.

It is to be noted that the coding apparatus of the second embodiment is a coding apparatus in which the block data generation mode and the motion compensation mode are not separate with each other. The second embodiment essentially different from the first embodiment, in the operation of the address generator as described above.

The mode judgment circuit 26 in FIG. 2 carries out, on the basis of data FMAD of a sum of differences between absolute values from the frame motion detector 22 and data FDAD of a sum of differences between absolute values from the field motion detector 21, judgment as to whether the motion predictive processing should be carried out, every frame or the motion predictive processing should be carried out every field in the motion predictive processing at the group of frame memories 20 with motion compensator of which operation will be described later in detail, and prepares a difference picture by using the judged result (corresponding to the predictive mode data MPFM/MPFD of the first embodiment), motion vectors FMMV/FDMV from the motion detectors (21, 22), and pictures from the group of frame memories 10, thus to also judge, on the basis of the difference picture, a mode of the block data generation processing most suitable for a picture which is outputted from the group of frame memories 10 and is subjected to DCT processing at the DCT circuit 13.

Namely, this mode judgment circuit 26 judges which any one of an efficiency in the case where the motion prediction is carried out in the frame predictive mode and generation of block data is carried out in the frame orthogonal transform mode PDFM and an efficiency in the case where the motion prediction is carried out in the field predictive mode and the generation of block data is carried out in the field orthogonal transform mode PDFD has a higher value. In other words, the mode judgment circuit 26 is of a structure in which the functions of the motion predictive mode judgment circuit 23 and the block data generation circuit 25 are combined.

It is to be noted that actual judgment of mode may be carried out similarly to the motion predictive mode and the block data generation mode in the first embodiment, for example.

The address generator 31 control the group of frame memories 10 so as to output macro block data generated as block data in accordance with the mode data PDFM/PDFD every macro block, for example, with respect to picture data stored in the group of frame memories 10. Namely, in the case where the above-mentioned mode data is data PDFM indicating coding processing every frame, the address generator 31 control the group of frame memories 10 so as to output macro block data shown in FIG. 5(B). Thus, unit block data of the macro block sent to the DCT circuit 13 is data in which even fields and odd fields are combined.

In contrast, in the case where the above-mentioned mode data is data PDFD indicating coding processing every field, the address generator 31 controls the group of frame memories 10 so as to sequentially output, by one frame (one picture), odd fields of respective macro blocks in the odd cycle thereafter to sequentially output, by one frame (one picture), even fields of respective macro blocks in the even cycle. Thus, unit block data of the macro block sent to the DCT circuit 13 is macro block data comprised of only odd fields in the odd cycle and is macro block data comprised of only even fields in the even cycle.

Namely, in the above-described efficient coding apparatuses of the first and second embodiments, since switching between the frame predictive mode and the field predictive mode in the motion prediction, and/or between the frame orthogonal transform mode and the field orthogonal transform mode in generation of block data in the DCT processing can be carried out every macro block, the highest efficient coding can be made every macro block.

The coding apparatuses of the first and second embodiments carry out motion prediction and DCT transform processing as shown below every format of so called a digital VTR, for example.

Figure 10A:
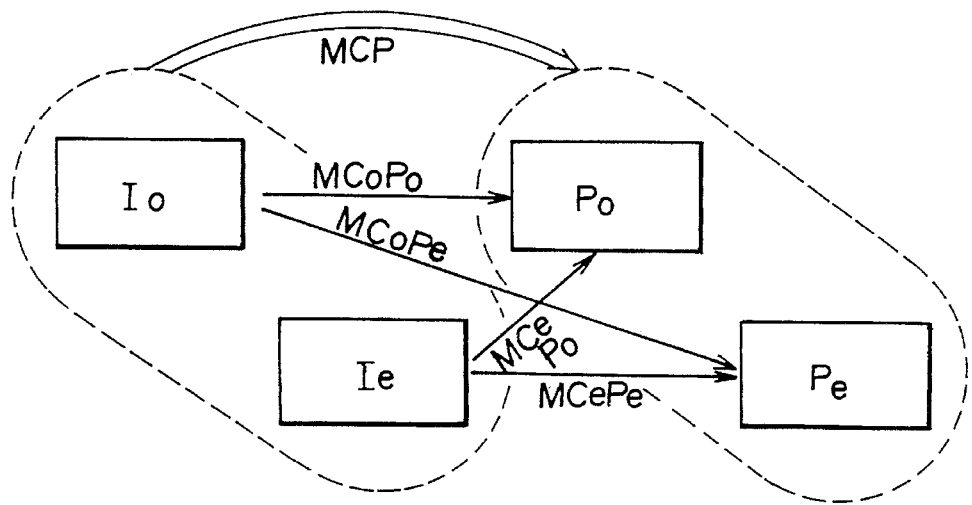
FIGS. 10(A) and 10(B) are views showing the state of motion prediction.
Figure 11:
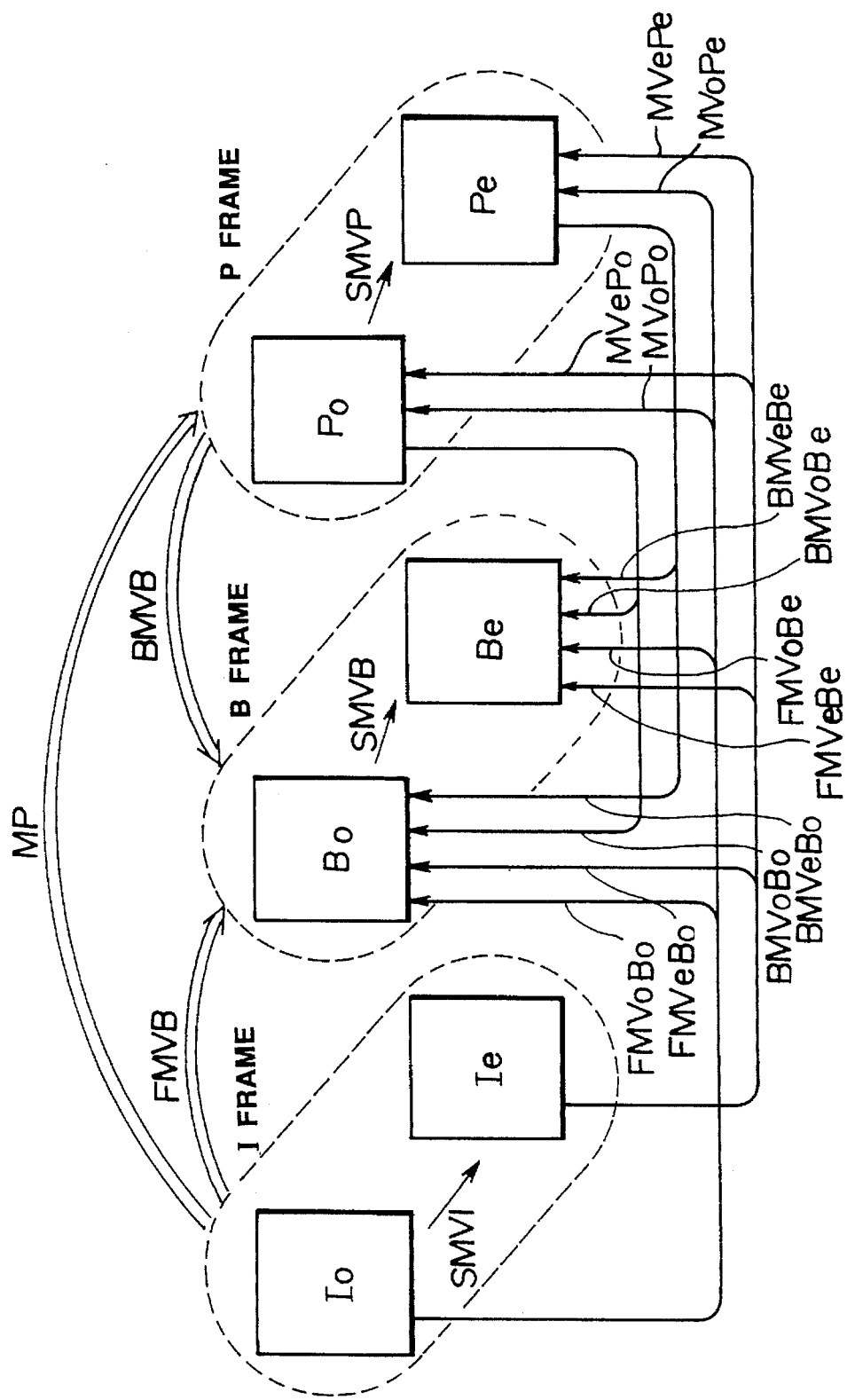
FIG. 11 is a view showing another state of motion prediction.

In FIG. 11, and FIGS. 10(A), (B), fields constituting the I frame (I picture) are assumed to be an Io field (odd field of the I frame) and Ie field (even field of the I frame), fields constituting the P frame (P picture) are assumed to be a Po field (odd field) and a Pe field (even field), and fields constituting the B frame (B picture) are assumed to be a Bo field (odd field) and a Be field (even field).

In the first and second embodiments, as shown in FIG. 5(B) referred to before, the frame orthogonal transform mode in generation of block data is a mode in which odd fields are even fields are combined to constitute the macro blocks (i.e., constitute macro blocks every frame) to use this macro block as a processing unit. Further, as shown in FIG. 5(C) referred to above, the field orthogonal transform mode in generation of block data is a mode to constitute macro blocks separately by odd and even fields (i.e., constitute macro blocks every field) to use this macro block as a processing unit. Accordingly, in one frame, for example, switching between the frame orthogonal transform mode and the field orthogonal transform mode is carried out every macro block.

Further, in the efficient coding apparatus of the first and second embodiments, with respect to one frame, the coding processing is divided into an odd cycle of a time period during which scan of odd fields in an interlaced scan is carried out and an even cycle during which scan of even fields in the interlaced scan is carried out.

Figure 9A:
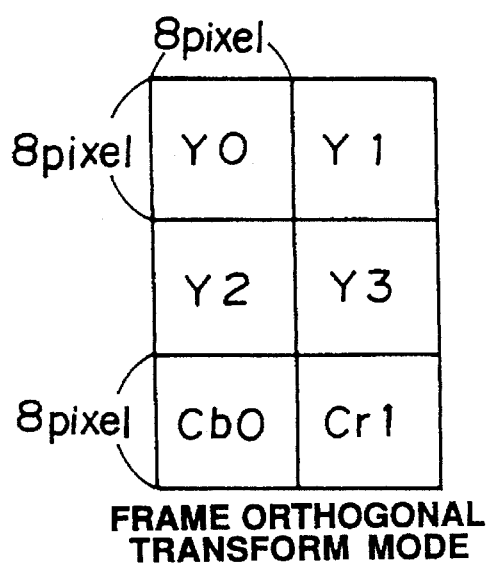
FIG. 9 is a view showing a unit block of the DCT processing in the frame orthogonal transform mode/field processing mode in an actual example of a format of a digital VTR.
Figure 9B:
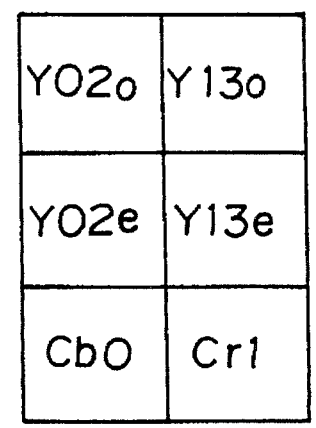

In the first embodiment, e.g., in the case of handling a digital VTR format of so called 4:2:0 component, as shown in FIG. 9, when generation of block data is carried out in the frame orthogonal transform mode, DCT processing of respective unit blocks of a macro block comprised of luminance blocks Y0 Y1, Y2, Y3 of odd and even fields and color difference blocks Cb0, Cr1 of the odd field is carried out.

On the contrary, when generation of block data is carried out in the field orthogonal transform mode, DCT processing of respective unit blocks of a macro block comprised of luminance blocks Y02o, Y13o of respective odd fields, luminance blocks YO2e, Y13e of respective even fields, and color difference blocks Cb0, Cr1 of odd fields is carried out.

With respect to the motion prediction in the case of the example of FIG. 9, as shown in FIG. 10(A), when the prediction mode is the frame predictive mode, a motion prediction MCP between the I frame and the P frame can be carried out. On the contrary, in the field predictive mode, a motion prediction MCoPo between the Io field and the Po field, a motion prediction PCoPe between the Io field and the Pe field, a motion prediction MCePo between the Ie field and the Po field, and a motion prediction MCePe between the Ie field and the Pe field can be carried out. Namely, in the case of FIG. 10(A), the motion predictive processing and the processing for generating block data can exist independently with respect to the frame prediction/processing mode and the field prediction/processing mode. In the frame prediction mode, one motion vector is determined. In the field prediction mode, two motion vectors are determined.

Accordingly, in the first embodiment, when generation of block data is carried out in the frame orthogonal transform mode, the Io field and the Ie field are combined in the above-mentioned odd cycle. Thus, the macro block is constituted. For example, in the odd cycle, DCT processing (DCT processing is carried out every unit block of 8×8 pixels), quantization, and variable length coding are carried out every macro block. On the contrary, no data is transmitted in the even cycle.

When generation of block data is carried out in the field orthogonal transform mode, the macro block is constituted with the Io field and the Ie field being separate with each other in the odd cycle. Thus, DCT processing (DCT processing is carried out every unit block of 8×8 pixels), quantization, and variable length coding are carried out every macro block. On the contrary, no data is transmitted in the even cycle as seen from FIG. 9.

In the case of the P frame, processing as described below will be conducted. For example, when generation of block data of the P frame is carried out in the frame orthogonal transform mode and the motion prediction is carried out in the frame prediction mode, an approach is employed in the odd cycle to assume a reference picture to be a picture forward in time (picture of one frame) to detect a motion vector MVP between frames to assume the macro block in which Io fields and Ie fields are combined one after another as a predictive picture to encode a difference between the predictive picture and an original picture. On the other hand, no data is transmitted in the even cycle.

When generation of block data of the P frame is carried out in the frame orthogonal transform mode and the motion prediction is carried out in the field prediction mode, an approach is employed in the odd cycle to respectively assume the Io field and the Ie field (or the Po field and the Pe field) to be reference pictures to detect a motion vector MVoPo between the Io field and the Po field, a motion vector MVePo between the Ie field and the Po field, a motion vector MVoPe between the Io field and the Pe field, and a motion vector MVePe between the Ie field and the Pe field to select a prediction in which a predictive error between a reference frame and a current P frame is minimum of prediction of odd fields, prediction of even fields, and prediction obtained by combining the both predictions (e.g., an average of prediction of even fields and prediction of odd fields) to assume the macro block in which Io fields and Ie fields are combined as a predictive picture to encode a difference between the predictive picture and an original picture. On the other hand, no data is transmitted in the event cycle.

Further, when generation of block data of the P frame is carried out in the field orthogonal transform mode and the motion prediction is carried out in the frame prediction mode, an approach is employed in the odd cycle to assume a reference picture to be a picture of the I frame (or a picture of the P frame) to detect a motion vector MVP between frames to assume the macro block constructed so that Io fields and Ie fields are separate with each other as a predictive picture to encode a difference between the predictive picture and an original picture (a macro block constructed so that Po fields and Pe fields are separate with each other). On the other hand, no data is transmitted in the same manner as above in the even cycle.

When generation of block data of the P frame is carried out in the field orthogonal transform mode and the motion prediction is carried out in the field prediction mode, an approach is employed in the odd cycle to respectively assume the Io field and the Ie field (or Po field and Pe field) to be reference pictures to detect a motion vector MVoPo between the Io field and the Po field, a motion vector MVePo between the Ie field and the Po field, a motion vector MVoPe between the Io field and the Pe field, and a motion vector MVePe between the Ie field and the Pe field to select a prediction in which a predictive error between a reference frame and a current P frame is minimum of prediction of odd fields, prediction of even fields (e.g., an average of prediction of even fields and prediction of odd fields) to assume the macro block constructed so that Io fields and Ie fields are separate with each other as a predictive picture to encode a difference between the predictive picture and an original picture (a macro block constructed so that Po fields and Pe fields are separate with each other). On the other hand, no data is transmitted in the even cycle.

In the case of the B frame, processing as described below will be carried out.

For example, when generation of block data of the B frame is carried out in the frame orthogonal transform mode and the motion prediction is carried out in the frame prediction mode, an approach is employed in the odd cycle to assume a reference picture to be pictures forward and backward in time to detect motion vectors between frames, i.e., a motion vector FMVB between the I frame and the B frame and a motion vector BMVB between the P frame and the B frame to select a prediction in which a predictive error between a reference frame and a current frame is minimum of the forward prediction, the backward prediction and the bidirectional prediction (average of the forward prediction and the forward prediction) to assume the macro block in which odd fields and even fields are combined one after another as a predictive picture to encode a difference between the predictive picture and an original picture. On the other hand, no data is transmitted in the even cycle.

When generation of block data of the B frame is carried out in the frame orthogonal transform mode and the motion prediction is carried out in the field predictive mode, an approach is employed in the odd cycle to assume a reference picture to be pictures forward and backward in time to respectively carry out prediction of odd fields and prediction of even fields with respect to these pictures to detect motion vectors, i.e., a mot on vector FMVoBo between the Io field and the Bo field, a motion vector FMVeBo between the Ie field and the Bo field, a motion vector FMVoBe between the Io field and the Be field, a motion vector FMVeBe between the Ie field and the Be field, a motion vector BMVoBo between the Po field and the Bo field, a motion vector BMVeBo between the Pe field and the Bo field, a motion vector BMVoBe between the Po field and the Be field, and a motion vector BMVeBe between the Pe field and the Be field to select a prediction in which a predictive error between a reference frame and a current frame of prediction of odd fields prediction of even fields by respective vectors, and prediction obtained by combining them (e.g., an average of prediction of even fields and prediction of odd fields) to assume the macro block in which Io fields and Ie fields (or Po fields and Pe fields) are combined as a predictive picture to encode a difference between the predictive picture and an original picture. On the other hand, no data is transmitted in the even cycle.

Further, when generation of block data of the B frame is carried out in the field orthogonal transform mode and the motion prediction is carried out in the frame prediction mode, an approach is employed in the odd cycle to assume a reference picture to be pictures forward and backward in time to detect motion vectors between frames, i.e., a motion vector FMVB between the I frame and the B frame and a motion vector BMVB between the P frame and the B frame to select a prediction in which a predictive error between a reference frame and a current frame is minimum of the forward prediction, the backward prediction, and bidirectional prediction (an average of the forward prediction and the backward prediction) to assume the macro block constructed so that odd fields and even fields are separate with other as a predictive picture to encode a difference between the predictive picture and an original picture. On the other hand, no data is transmitted in the even cycle.

When generation of block data of the B frame is carried out in the field orthogonal transform mode and the motion prediction is carried out in the field prediction mode, an approach is employed in the odd cycle to assume a reference picture to be pictures forward and backward in time to respectively carry out prediction of odd fields and prediction of even fields with respect to these pictures to detect respective motion vectors, i.e., a motion vector FMVoBo between the Io field and the Bo field, a motion vector FMVeBo between the Ie field and the Bo field, a motion vector FMVoBe between the Io field and the Be field, a motion vector FMVeBe between the Ie field and the Be field, a motion vector BMVoBo between the Po field and the Bo field, a motion vector BMVeBo between the Pe field and the Bo field, a motion vector BMVoBe between the Po field and the Be field, and a motion vector BMVeBe between the Pe field and the Be field to select a prediction in which a predictive error between a reference frame and a current frame is minimum of prediction of odd fields and prediction of even fields by respective vectors and the prediction obtained by combining both predictions (e.g., an average of prediction of even fields and prediction of odd fields) to assume the macro block constructed so that Io fields and Ie fields (or Po fields and Pe fields) are separate with each other) as a predictive picture to encode a difference between the predictive picture and an original picture. On the other hand, no data is transmitted in the even cycle.

It is to be noted that, in the case of the first embodiment, as seen from FIG. 10(A), it is impossible to carry out a motion prediction between the Io field and the Ie field, a motion prediction between the Po field and the Pe field, and a motion prediction between the Bo field and the Be field.

Figure 12:
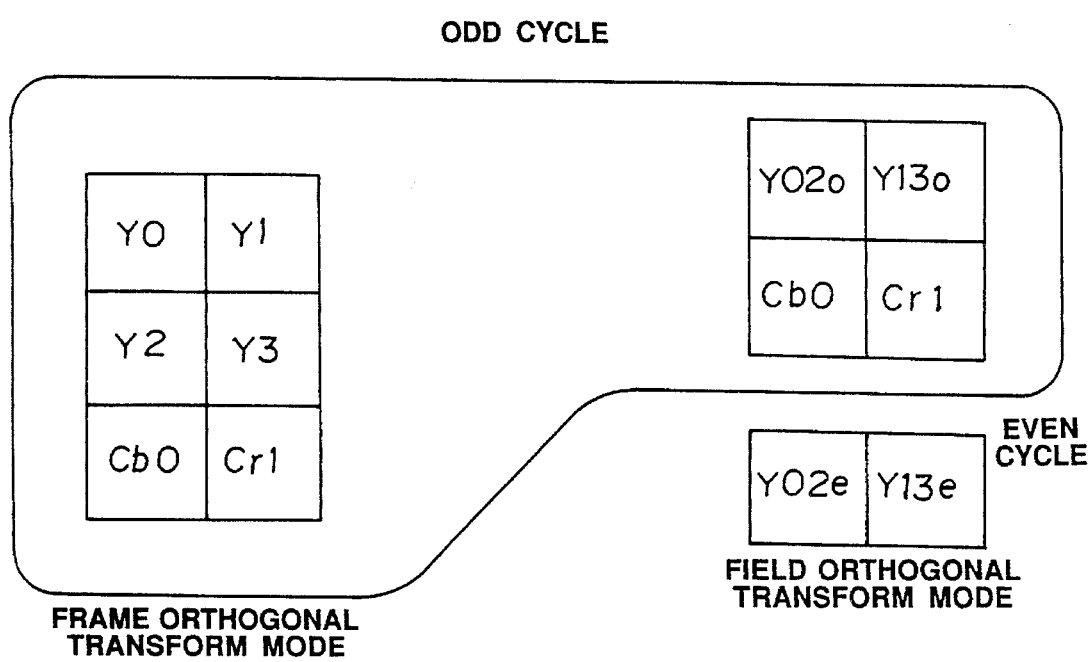
FIG. 12 is a view showing a unit block of the DCT processing in the frame orthogonal transform mode/field orthogonal transform mode in an actual example of a format of a digital VTR.

In this case, if the prediction system of the second embodiment is employed, prediction from odd fields to even fields can be carried out in respective pictures. Namely, as shown in FIG. 12, for example, when generation of block data is carried out in the frame orthogonal transform mode, an approach is employed in the odd cycle to carry out DCT processing of respective unit blocks of a micro block MB comprised of luminance blocks Y0, Y1, Y2, Y3 of odd and even fields and color difference blocks Cb0, Cr1 of odd fields. Further, when generation of block data is carried out in the field orthogonal transform mode, an approach is employed in the odd cycle to carry out DCT processing of respective unit blocks comprised of respective luminance blocks Y02o, Y13o of odd fields and respective color difference blocks Cb0, Cr1 of odd fields. Thereafter, an approach is employed in the even cycle to carry out DCT processing of respective units blocks comprised of respective luminance blocks Y02e, Y13e of even fields.

Figure 10B:
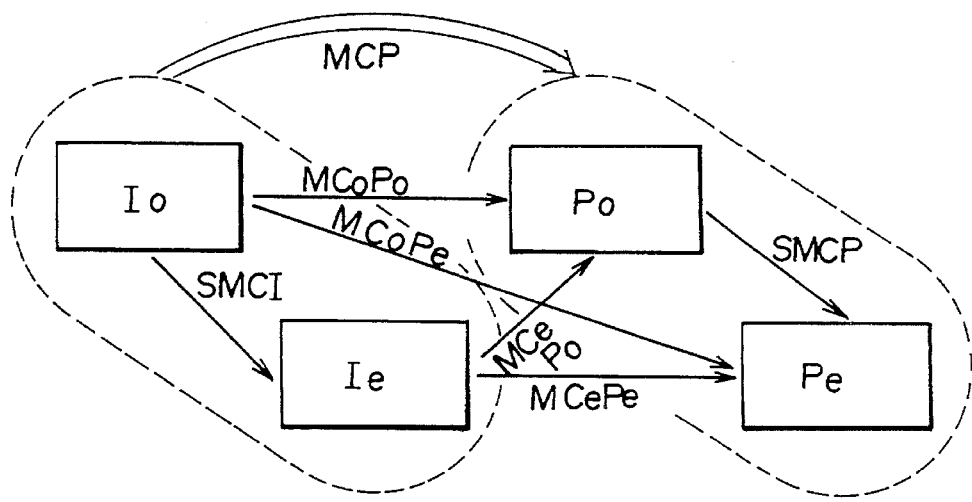

The motion prediction in the case of the example of FIG. 12 is as follows. Namely, as shown in FIG. 10(B), a motion prediction SMCI between the Io field and the Ie field, and a motion prediction SMCP between the Po field and the Pe field can be carried out in addition to respective motion predictions MCP, MCoPo, MCoPe, MCePo and MCePe of FIG. 12.

Accordingly, in the second embodiment, for example, when generation of block data of the I frame is carried out in the frame orthogonal transform mode, an approach is employed in the odd cycle such that the Io field and the Ie field are combined, whereby the macro block is constituted. Thus, in the odd cycle, for example, DCT processing (DCT processing is carried out every unit, block of 8×8 pixels), quantization, and variable length coding are carried out every macro block. On the contrary, no data is transmitted in the even cycle.

When generation of block data is carried out in the field orthogonal transform mode, an approach is employed in the odd cycle to similarly encode only odd fields of the macro block. Thus, for example, at the time point when the odd cycle is completed, the entirety of the Io field and the macro block portion of the Ie field by the frame orthogonal transform mode can be obtained. Further, in the even cycle of the I frame, motion prediction is carried out with the Io field being as a reference picture with respect to the macro block of the Ie field by the field orthogonal transform mode to encode a difference picture between that motion vector SMVI and the predictive picture.

In the case of the P frame, processing as described below will be carried out. For example, when generation of block data of the P frame is carried out in the frame orthogonal transform mode and the motion prediction is carried out in the frame prediction mode, an approach is employed in the odd cycle to assume a reference picture to be a picture forward in time (picture of the I frame) to detect a motion vector MVP between frames to assume the macro block in which Io field and Ie field are combined as a predictive picture to encode a difference between the predictive picture and an original picture. On the other hand, no data is transmitted in the even cycle.

When generation of block data is carried out in the field orthogonal transform mode and the motion prediction is carried out in the field prediction mode, an approach is employed in the odd cycle to respectively assume the Io field and the Ie field (or Po field and Pe field) to be reference pictures to detect a motion vector MVoPo between the Io field and the Po field and a motion vector MVePo between the Ie field and the Po field to select a prediction in which a predictive error between the odd or even field of a reference frame and the odd field of a current frame is minimum of the prediction of the odd field, prediction of the even field and the prediction obtained by the both predictions (e.g., an average of prediction of the even field and the prediction of the odd field) to encode a difference between an original picture and the predictive picture.

On the contrary, an approach is employed in the even cycle of this mode to detect, with respect to macro blocks in the field orthogonal transform mode, a motion vector MVoPe between the Io field and the Pe field, a motion vector MVePe between the Ie field and the Pe field, and a motion vector SMVP between the Po field and the Pe field to select a prediction in which a predictive error is minimum from the prediction of odd fields, the prediction of even fields, and the prediction of the odd fields of a current frame by respective vectors (motion prediction from the Po field to carry out only the even cycle), and the prediction by an average of two predictions selected from the above-mentioned predictions, thus to encode a difference between an original picture and the predictive picture.

Further, for example, when generation of block data of the B frame is carried out in the frame orthogonal transform mode and the motion prediction is carried out in the frame prediction mode, an approach is employed in the odd cycle to assume a reference picture to be pictures forward and backward in time to detect motion vectors between frames, i.e., a motion vector FMVB between the I frame and the B frame and a motion vector BMVB between the P frame and the B frame to select a prediction in which a predictive error between a reference frame and a current frame is minimum from the forward prediction, the backward prediction, and the bidirectional prediction (average of the forward prediction and the backward prediction) to encode a difference between an original picture and that predictive picture. On the other hand, no data is transmitted in the even cycle.

When generation of block data is carried out in the field orthogonal transform mode and the motion prediction is carried out in the field prediction mode, an approach is employed in the odd cycle to assume a reference picture to be pictures forward and backward in time to respectively carry out prediction of odd fields and prediction of even fields with respect to these pictures to detect respective motion vectors, i.e., a motion vector FMVoBo between the Io field and the Bo field, a motion vector FMVeBo between the Ie field and the Bo field, a motion vector BMVoBo between the Po field and the Bo field, and a motion vector BMVeBo between the Pe field and the Bo field. In the same manner as stated above, prediction in which a predictive error is minimum is selected to encode a difference between an original picture and that predictive picture.

Further, an approach is employed in the even cycle of this mode to carry out respective predictions by a motion vector FMVoBe between the Io field and the Be field, a motion vector FMVeBe between the Ie field and the Be field, a motion vector BMVoBe between the Po field and the Be field, and a motion vector BMVeBe between the Pe field and the Be field in addition to prediction of odd fields of a current frame (i.e., prediction by a motion vector SMVB between the Bo field and the Be field) to select a prediction in which a predictive error is minimum, thus to encode a difference between an original picture and that predictive picture.

Further, in the first embodiment, in the case of handling a digital VTR format of so called 4:2:2 component, an approach is employed as shown in FIG. 13 such that when the orthogonal transform mode is the frame orthogonal transform mode, DCT processing of respective unit blocks of a macro block comprised of luminance blocks Y0, Y1, Y2, Y3 of odd and even fields and color difference blocks Cb01, Cr01, Cb23, Cr23 of odd and even fields is carried out. On the other hand, when the orthogonal transform mode is the field orthogonal transform mode, DCT processing of respective unit blocks of a macro block comprised of luminance blocks Y02o, Y13o of odd fields, color difference blocks Cb0123o, Cr0123o of respective odd fields, luminance blocks Y02e, Y13e of even fields, and color difference blocks Cb0123e, Cr0123e of even fields is carried out.

The motion prediction in the case of the example of FIG. 13 is as shown in FIG. 10(A) referred to above. As seen from this figure, motion prediction between the Io field and the Ie field, motion prediction between the Po field and the Pe field, and motion prediction between the Bo field and the Be field cannot be carried out.

Accordingly, in this case, the prediction system of the second embodiment may be used as described above. Namely, when generation of block data is carried out in the frame orthogonal transform mode, as shown in FIG. 13, for example, an approach is employed in the odd cycle to carry out DCT processing of respective unit blocks of a macro block comprised of luminance blocks Y0, Y1, Y2, Y3 and color difference blocks Cb01, Cr01, Cb23, Cr23 of odd and even fields. Further, when generation of block data is carried out in the field orthogonal transform mode, an approach is employed in the odd cycle to carry out DCT processing of respective unit blocks of respective luminance blocks Y02o, Y13o of the odd fields and respective color difference blocks Cb0123o, Cr0123o of the odd fields. Thereafter, an approach is employed in the even cycle to carry out DCT processing of respective unit blocks of respective luminance blocks Y02e, Y13e of even fields and respective color difference blocks Cb0123e, Cr0123e of even fields.

The motion prediction in the case of the above-mentioned example of FIG. 13 is the same as that of FIG. 10(B).

Furthermore, in the first and second embodiments, in the case of handling a digital VTR format of the 4:2:2 component, the motion prediction of frame is carried out every macro block MB as shown in FIG. 14, for example, in addition to processing as shown in FIG. 13 referred to above.

In the case of carrying out motion prediction of field, a certain macro block MB (i, j) and a macro block MB (i+1, j) positioned therebelow may be combined into a group to carry out motion prediction of odd fields and motion prediction of even fields with respect to the group of these macro blocks MBg.

Figure 15:
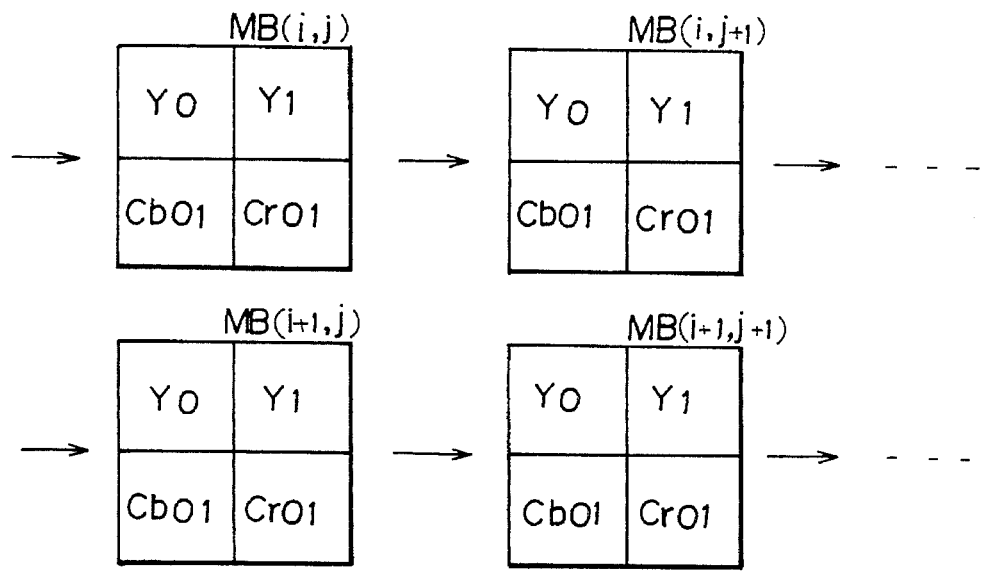
FIG. 15 is a view for explaining a sets of macro blocks and the manner of processing in the frame orthogonal transform mode.

The extracted diagram of a macro block of a portion of the frame in the case of the example of FIG. 14 is shown in FIG. 15. In FIG. 15, the processing is assumed to proceed in a direction indicated by arrows. Namely, in FIG. 15, a subsequent macro block MB (i, j+1) relative to a certain macro block MB (i, j) and macro blocks Mb (i+1, j) and MB (i+1, j+1) positioned therebelow (of the next line) are indicated.

In a macro block as shown in FIG. 15, for example, in the case of the frame orthogonal transform mode, respective luminance blocks Y0, Y1 and color difference blocks Cb01 , Cr01 are subjected to DCT processing every respective macro blocks MB (i, j), MB (i, j+1), . . . , MB (i+1, j), MB (i+1, j+1) . . . . For this reason, in the case of the frame orthogonal transform mode, the processing of respective macro blocks are not affected by the processing modes of other macro blocks.

Figure 16:
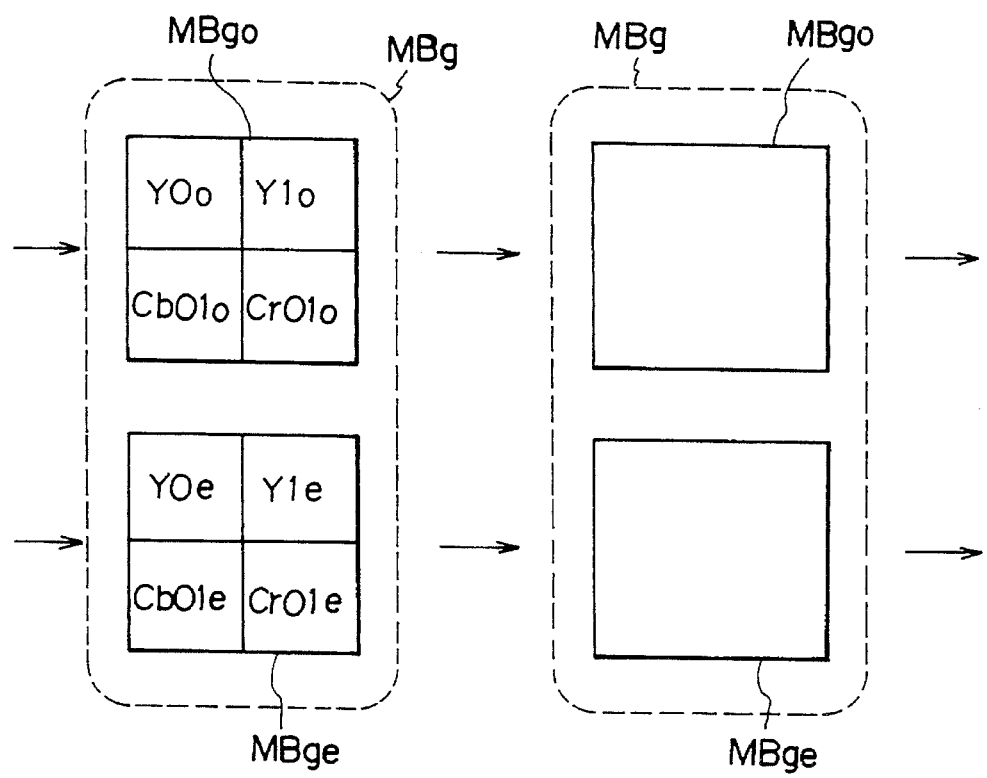
FIG. 16 is a view for explaining the manner of processing in the field orthogonal transform mode in the example of FIG. 15.

On the contrary, in the case of the field orthogonal mode, an approach is employed as shown in FIG. 16 to divide a macro block constituting the set MBg of macro blocks into a macro block MBgo of odd field and a macro block MBge of even field to carry out DCT processing of luminnace blocks Y0o, Y1o and color difference blocks Cb01o, Cr01o in the macro block MBgo of odd field.

Assuming now that, e.g., the set MBg of macro blocks consist of macro blocks Mb (i, j) and MB (i+1, j) of FIG. 15, luminance block Y0o, Y1o in the macro block MBgo of odd field in the macro block MBg consist of luminance blocks of odd fields of the macro block MB (i, j) and luminance blocks of odd fields of the macro block MB (i+1, j). Further, color difference blocks Cb01o, CF01o in the macro block MBgo of odd fields similarly consist of color difference blocks of odd fields of the macro block MB (i, j) and color difference blocks of odd fields of the macro block MB (i+1, j).

In a manner similar to the above, luminance blocks Y0e, Y1e in the macro block MBge of even fields consist of luminnace blocks of even fields of the macro block MB (i, j) and luminance blocks of even fields of the macro block MB (i+1, j). Further, color difference blocks Cb01e, Cr01e in the macro block MBge of even fields consist of color difference blocks of even fields of the macro block MB (i, j) and color difference blocks of even field of the macro block MB (i+1, j).

From the fact as described above, the relationship between the motion prediction and respective DCT processing is as described below. Namely, in the coding apparatus of this embodiment, in the case where the motion prediction is carried out in the frame orthogonal transform mode and DCT processing is carried out in the frame orthogonal transform mode with respect to, e.g., the macro block MB (i, j), a picture decoded in the group of frame memories 20 with a motion compensator is assumed to be a reference frame to carry out DCT processing of a difference between a predictive picture taken out from the reference frame and an input picture (original picture). Then, DCT coefficients and frame motion vectors are transmitted.

Moreover, for example, in the macro block MB (i, j), in the case of the motion prediction in the field orthogonal transform mode and DCT processing in the field orthogonal transform mode, at this macro block MB (i, j) a difference between a predictive picture taken out form odd fields and an original picture of odd fields and motion vectors of odd fields are coded. Further, at the macro block MB (i+1, j) a difference between a predictive picture taken from even fields and an original picture of even fields, and motion vectors of even fields are coded.

Further, for example, in the macro block MB (i, j), in the case of the motion prediction in the field orthogonal transform mode and the DCT processing in the frame orthogonal transform mode, at this macro block MB (i, j), a frame difference between a predictive picture with respect to the position of the macro block MB (i, j) taken out from a reference frame and an input picture, motion vectors of odd fields, and motion vectors of even fields are transmitted. Moreover, at the macro block MB (i+1, j), a frame difference between a predictive picture with respect to the position of the macro block MB (i+1, j) taken out from a reference frame and an input picture is transmitted.

Further, for example, in the macro block MB (i, j), in the case of the motion prediction in the frame orthogonal transform mode and the DCT processing in the field orthogonal transform mode, at this macro block MB (i, j), a difference between a predictive picture taken out from odd fields and an original picture of odd fields, frame motion vectors of the macro block MB (i, j), and frame motion vectors of the macro block MB (i+1, j) are transmitted. In addition, at the macro block MB (i+1, j), a difference between a predictive picture of odd fields and an input picture is transmitted.

Meanwhile, in this coding apparatus, an approach is employed to add expansion bits to the conventional macro block type to allow this apparatus to be compatible with conventional apparatuses, thereby realizing this coding system (format).

Namely, in the case of the first embodiment, for example, in the B frame, there are three prediction systems of the forward prediction, the backward prediction, and the bidirectional prediction as the macro block type. With respect to the forward prediction, when the prediction mode is the field prediction mode, two kinds of predictions from an odd field and an even field of a former frame are conceivable. Accordingly, by adding an expansion bit for recognizing whether a prediction employed is any of two kinds of predictions, the coding format of this invention is realized. Since there are two kinds of predictions in this case, it is sufficient to add one bit as expansion bit with respect to one direction (forward or backward prediction). For example, in the forward or backward prediction, in the case of prediction from an odd field, it is sufficient to add, as an expansion bit, code "1" to the conventional macro block type; and in the case of prediction from an even field, to add, as an expansion bit, code "0" to the conventional macro block type. In addition, in the case of the bidirectional prediction, bidirectional expansion bits are added with respect to the forward or backward prediction.

It is to be noted that if the prediction mode is the frame prediction mode, no expansion bit is added to adopt the same form as that of a conventional bit stream.

This may similarly apply to the case of the P frame.

In the case of the second embodiment, for example, in the B frame, there are forward prediction, backward prediction, and bidirectional prediction as described above as the macro block type. With respect to the forward prediction, at the time of the field prediction mode, an expansion bit for recognizing whether a prediction employed is prediction from an odd field, prediction from an even field, or prediction from an odd field in a current frame must be added to the macro block type. Namely, in the field prediction mode of the forward prediction, since there is prediction from in the current frame, an expansion bit of one or two bits is required in order to represent three kinds of predictions including predictions from odd and even fields with an expansion bit. On the other hand, in the field prediction mode of the backward prediction, since there are only two kinds of predictions from odd and even fields, one bit is always required as an expansion bit. Namely, it is sufficient to add the following codes to the conventional macro block type as an expansion bit depending upon the kind of predictions. For example, in the forward prediction, in the case of prediction from an odd field of a former frame, code "1" is added; in the case of prediction from an even field of a former frame, code "01" is added; and in the case of prediction from an odd field of a current frame, code "11" is added. On the other hand, in the backward prediction, in the case of prediction from an odd field of a later frame, code "1" is added; and in the case of prediction from an even field of a later frame, code "0" is added.

It is to be noted that if the prediction mode is the frame prediction mode, no expansion bit is added to adopt the same form as that of the conventional bit stream (MPEG). In addition, in the case of the bidirectional prediction, bidirectional expansion bits are added with respect to the forward or backward prediction.

This may similarly apply to the case of the P frame.

Figure 17:
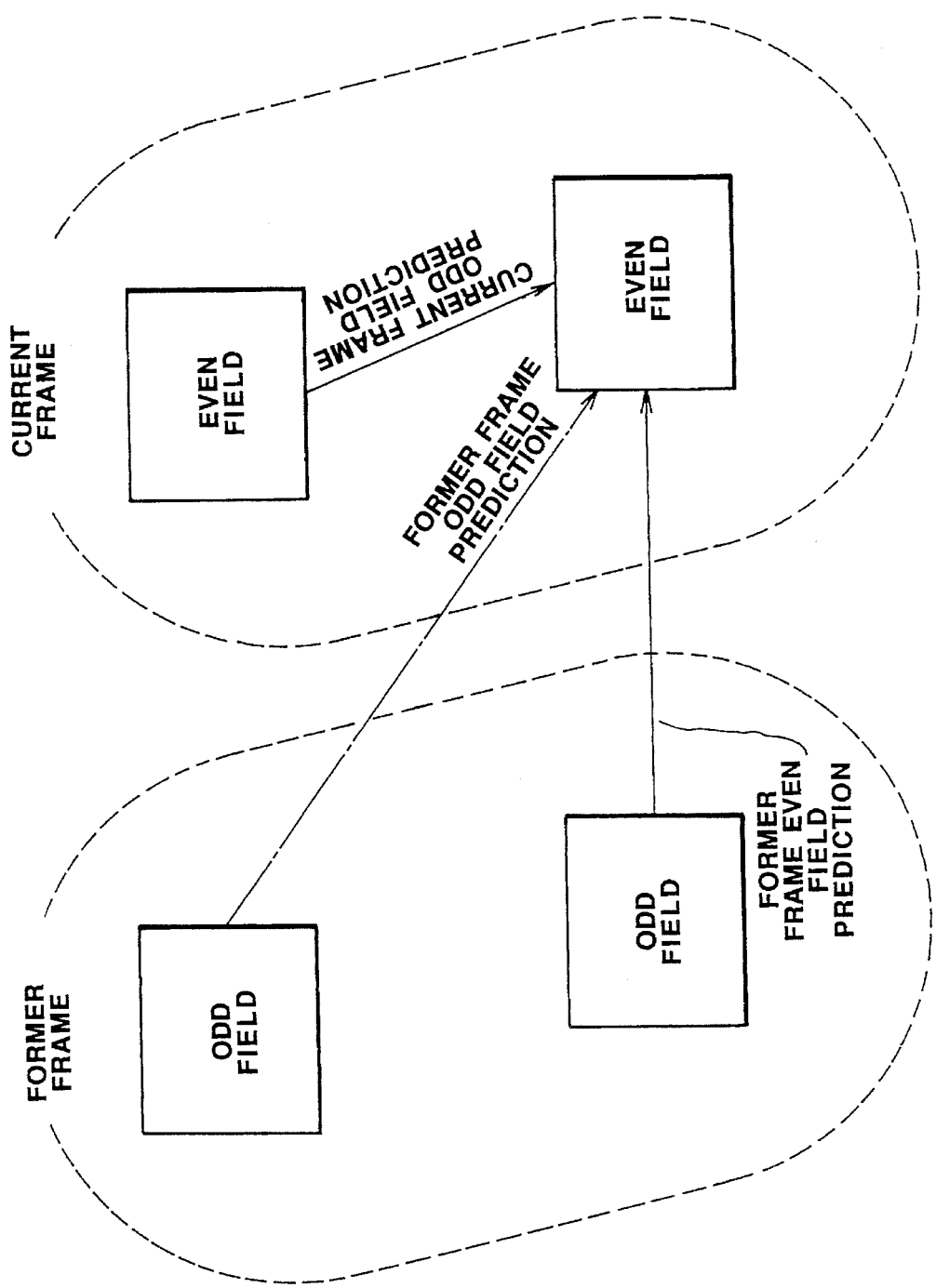
FIG. 17 is a view for explaining a modified example (as to forward prediction) of addition of expansion bits in the second embodiment.

Further, a scheme may be employed as a modification thereof to reduce the number of expansion bits in the case of the forward prediction to one bit. Namely, in the even cycle in the field prediction mode, as shown in FIG. 17, prediction from an odd field of a former frame having the maximum time difference relative to a current frame is abolished to thereby reduce the number of forward prediction modes to two, thus making it possible to transmit the forward prediction mode by expansion of one bit. Namely, it is sufficient to add the following codes to the conventional macro block type as an expansion bit depending upon the kind of predictions. In actual terms, in the forward prediction in the odd cycle, in the case of prediction from an odd field of a former frame, code "1" is added; and in the case of prediction from an even field of a former frame, code "0" is added. Further, in the forward prediction in the even cycle, in the case of prediction from an odd field of a current, frame, code "1" is added; and in the case of prediction from an even field of a former frame, code "0" is added. In addition, in the forward prediction, in the case of prediction from an odd field of a later frame, code "1" is added; and in the case of prediction from an even field of a later frame, code "0" is added.

Description of the Third Embodiment

Figure 3:
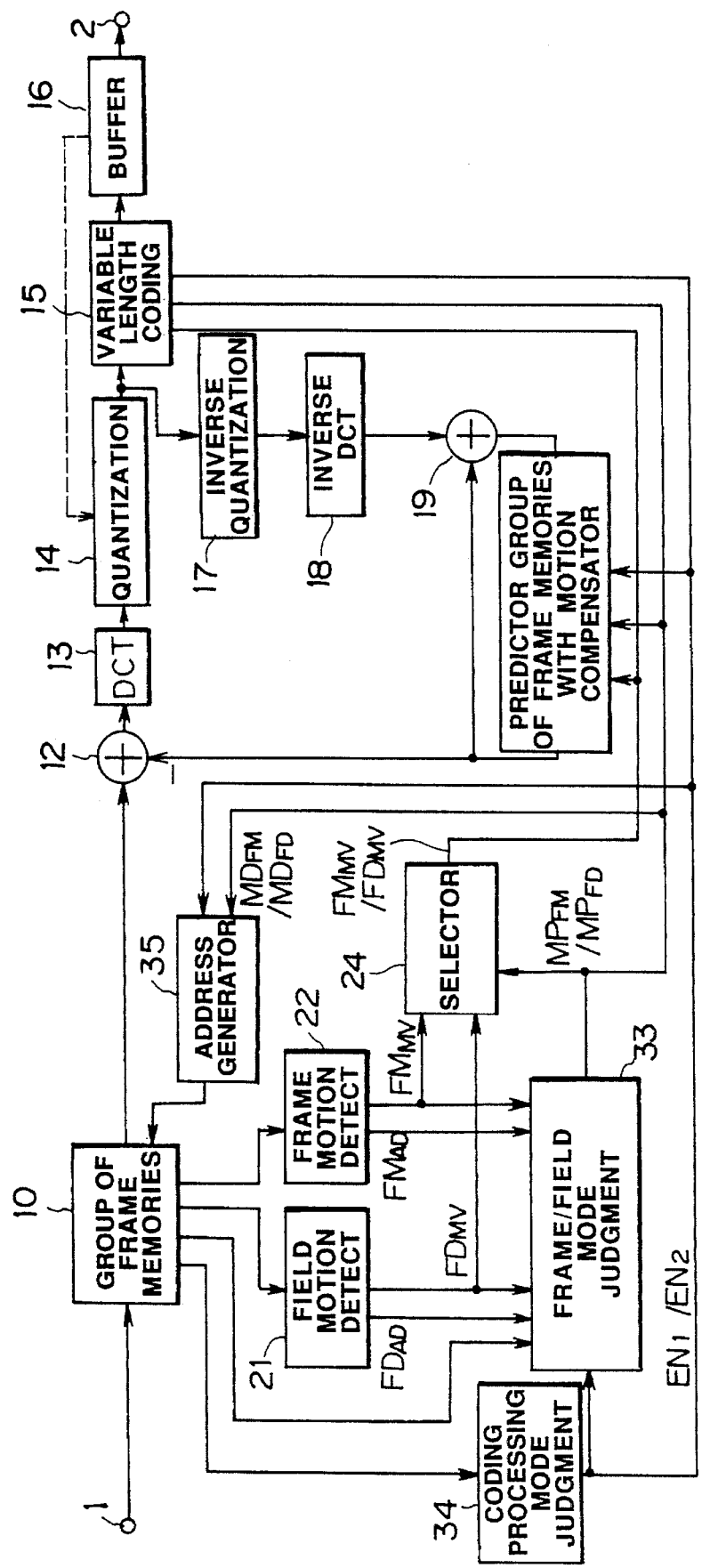
FIG. 3 is a block diagram showing the outline of the configuration of an efficient coding apparatus for a picture signal of a third embodiment.

FIG. 3 shows an efficient coding apparatus for a picture signal of a third embodiment of this invention. In FIG. 3, blocks to which the same reference numerals as those of FIG. 1 are attached have the same functions of those of the blocks of FIG. 1, respectively. Accordingly, explanation will be given in connection with blocks to which reference numerals different from those of FIG. 1 are attached.

Namely, the efficient coding apparatus of FIG. 3 comprises a mode judgment circuit 33 and selector 24 serving as mode selection means for judging, by using information outputted from the motion detection means, which any one of an efficiency in the case where the motion compensation is carried out in the frame prediction mode and generation of block data for orthogonal transform processing is carried out, in the frame orthogonal transform mode and an efficiency in the case where motion compensation is carried out in the field prediction mode and generation of block data for orthogonal transform processing is carried out in the field orthogonal transform mode has a higher value, thus to select a prediction mode of a higher efficiency; and an address generator 35 serving as address generation means adapted for recognizing whether a current cycle is an odd cycle of a time period during which scan of odd fields is carried out or an even cycle during which scan of even fields is carried out in an interlaced scan of coding processing with respect to one frame (one picture) to control a group of frame memories so as to sequentially output, by one frame, odd fields of macro blocks in the odd cycle only when the mode of the mode judgment circuit 33 is the mode for the field prediction/field processing, thereafter to sequentially output, by one frame, even fields of macro blocks in the even cycle.

The efficient coding apparatus for a picture signal of the third embodiment shown in FIG. 3 further comprises, in addition to the motion detection means and the frame/field mode judgment circuit 33, a coding processing mode judgment circuit 34 serving as third mode selection means for judging which any one of a first coding processing mode for adaptively switching generation of block data for orthogonal transform processing into the frame orthogonal transform mode or the field orthogonal transform mode every respective macro blocks in one frame to encode respective macro block data on the basis of a mode obtained by switching and a second coding processing mode for carrying out generation of block data for orthogonal transform processing of all macro blocks in one frame in the field orthogonal transform mode to encode, by one frame, only odd fields comprised of macro blocks in an odd cycle of a time period during which scan of odd fields in an interlaced scan is carried out thereafter to encode, by one frame, even fields comprised of macro blocks in an even cycle of a time period during which scan of even fields in the interlaced scan is carried out has a higher efficiency in coding processing, thus to select a coding processing mode of a higher efficiency.

As described above, the apparatus of this embodiment comprises the address generator 35 for recognizing whether a current cycle is the odd cycle or the even cycle, whereby when the coding processing mode is the first coding processing mode, the address generator 35 controls the group of frame memories 10 so as to output macro block data generated in correspondence with the block data generation mode for orthogonal transform processing in the odd cycle, while when the coding processing mode is the second coding processing mode, the address generator 35 controls the group of frame memories 10 so as to output macro block data generated in correspondence with the field orthogonal transform mode in the odd cycle and the even cycle.

In the coding apparatus of this embodiment, which any of the frame motion prediction mode and the field motion prediction mode has a higher efficiency in carrying out motion compensation, can be selected by the above-described first mode selection means. Further, which any one of the frame orthogonal transform mode and the field orthogonal transform mode has a higher efficiency in carrying out orthogonal transform processing can be selected by the second mode selection means. In this embodiment, selection of the first and second modes is carried out by the above-described frame/field mode judgment circuit 33.

Further, the apparatus of this embodiment carries out mode selection processing by the first and second mode selection means, and carries out coding processing in any one of two coding processing modes of a higher efficiency with respect to respective frames. Namely, as described above, in the first coding processing mode, switching between the frame orthogonal transform mode and the field orthogonal transform mode is adaptively carried out every respective macro blocks in one frame, thus to encode respective macro block data.

In addition, as described above, in the second coding processing mode, an approach is employed to carry out, in the field orthogonal transform mode, generation of block data for orthogonal transform processing of all macro blocks in one frame to encode, by one frame, only odd fields in macro block data in the odd cycle of a time period during which scan of odd fields (first fields) is carried out thereafter to encode, by one frame, even fields in macro block data in the even cycle of a time period during which scan of even fields (second fields) is carried out. The third mode selection means is used to judge which any one of the first and second coding processing modes has a higher efficiency in coding, thus to select a coding processing mode of a higher efficiency.

Namely, in the first coding processing mode, there is carried out a processing to adaptively conduct switching between a mode for encoding block data every frame without dividing each frame into a first field (odd field) and a second field (even field) (the above-mentioned frame orthogonal transform mode) and a mode in which each frame is divided into first and second fields to encode block data every field (the above-mentioned field orthogonal transform mode) such that the frame orthogonal transform mode is used in a macro block in which, e.g., movement of picture is small, and that the field orthogonal transform mode is used in a macro block in which, e.g., movement of picture is great.

Accordingly, in the case where the frame orthogonal transform mode is selected in the first coding processing mode, e.g., in the motion prediction of P and B frames, a motion prediction is carried out from frames forward and backward in time, whereby a difference picture between an original picture and a predictive picture is subject to orthogonal transform (DCT) processing. Moreover, in the case where the field orthogonal transform mode is selected in the first coding processing mode, for example, in the motion prediction of P and B frames, motion prediction is carried out from the first of second field of frames forward and backward in time with respect to the first and second fields of macro block data, whereby a difference picture between an original picture and a predictive picture thus obtained is subjected to DCT processing. From such facts, it can be said that the first coding processing mode is a coding in which there no interfield prediction in a frame. Additionally, this first coding processing mode, coding processing is carried out in the odd cycle.

In the above-mentioned first coding processing mode, motion prediction between respective fields in a frame (between an odd field and an even field in the same frame) cannot be carried out.

Accordingly, in the second coding processing mode of this embodiment, as described above, an approach is employed to carry out generation of block data for orthogonal transform processing of all macro blocks in respective frames in the field orthogonal transform mode to encode, by one frame, only odd fields in macro block data in the odd cycle thereafter to encode, by one frame, even field in macro block data in the even cycle. Accordingly, in accordance with the second coding processing mode, since the odd field (first field) is coded first, motion prediction of the even field (second field) can be carried out from the odd field (first field). From such fact, it can be said that the second coding processing mode is a coding of frame in which there is an interfield prediction in a frame.

Turning back to FIG. 3 for a second time, the selector 24 selectively outputs, in dependency upon motion predictive mode data MPFM/MPFD from the frame/field mode judgment circuit 33, any one of data FMMV of motion vectors between frames delivered from the frame motion detector 22 and data FDMV of motion vectors between fields delivered from the field motion detection circuit 21. Namely, when the motion predictive data is data MPFD indicating the field motion predictive mode, the selector 24 selects and outputs motion vector data FDMV from the field motion detector 21, while when the motion predictive mode data is data MPFM indicating the frame motion predictive mode, the selector 24 selects and outputs motion vector data FMMV from the frame motion detector 22.

The motion vector data FMMV/FDMV selected at the selector 24 is sent to the group of frame memories 20 with motion compensator. Thus, this group of frame memories 20 can carry out motion compensation every frame or every field on the basis of the motion predictive mode data MPFM/MPFD and the motion vector data FMMV/FDMV.

In addition, to the frame/field mode judgment circuit 33, picture data every macro block read out from the group of frame memories 10 is also delivered. This frame/field mode judgment circuit 33 carries out, at the same time, a processing to prepare a difference picture by using the motion predictive mode data MPFM/MPFD and the motion vector data FMMV/FDMV, and picture data from the group of frame memories 10 to select, on the basis of the difference picture, a mode of processing for generating block data for orthogonal transform most suitable for a picture outputted from the group of frame memories 10 and subjected to DCT processing at the DCT circuit 13. It is to be noted that, in the case of the I picture (or I frame), data of a picture (original picture) of the group of frame memories 10 is used in place of the difference picture.

The frame/field mode judgment circuit 33 outputs data MDFD of the field orthogonal transform mode in the processing for generating block data for orthogonal transform processing, or outputs data MDFM of the frame orthogonal transform mode in the processing for generating block data for orthogonal transform processing.

Here, an output of the frame orthogonal transform mode data MDFM of field orthogonal transform mode data MDFD from the frame/field mode judgment circuit 33 is caused to be in correspondence with coding mode data EN1/EN2 corresponding to the first coding processing mode or the second coding processing mode from the coding processing mode judgment circuit 34.

This coding processing mode judgment circuit 34 judges, by using picture data every macro block read out from the group of frame memories 10, which any one of the first and second coding processing modes has a higher efficiency in coding to output the coding mode data EN1 or EN2 corresponding to the judged result. In actual terms, the coding processing mode judgment circuit 34 calculates a sum of differences between absolute values of respective pixels, e.g., between an odd field (first field) and an even field (second field) of each frame to out, put coding mode data EN1 indicating that coding in the first coding processing mode has a higher efficiency when the value of the sum of differences is less than, e.g., a certain threshold value TO (i.e., movement, of picture is small), and to output, coding mode data EN2 indicating that coding in the second coding processing mode has a higher efficiency when the value of the sum of differences is more than TO (movement of picture is great).

It is to be noted that, in judgment in the coding processing mode judgment, circuit 34, motion vector data FDMV from the field motion detector 21 may be used to carry out judgment. Namely, such an approach may be employed to select the first coding processing when mode motion vector data FDMV between the odd field and the even field is less than a certain threshold value t0, and to select the second coding processing mode when that motion vector data is more than t0.

When the coding mode data EN1/EN2 from the coding processing mode judgment circuit 34 is sent to the frame/field mode judgment circuit 33, frame orthogonal transform mode data MDFM or field orthogonal transform mode data MDFD corresponding to the coding mode data EN1/EN2 is outputted from the frame/field mode judgment circuit 33.

Namely, in the case where coding mode data from the coding processing mode judgment circuit 34 is data EN1 indicating the first coding processing mode, the frame/field mode judgment circuit 33 conducts a processing to adaptively carry out switching between the frame orthogonal transform mode and the field orthogonal transform mode every respective macro blocks in one frame. Accordingly, the frame orthogonal transform mode data MDFM or the field orthogonal transform mode data MDFD adaptively switched is outputted from the frame/field mode judgment circuit 33.

On the contrary, in the case where coding mode data from the coding processing mode judgment circuit 34 is data EN2 indicating the second coding processing mode, the frame/field mode judgment circuit 33 carries out, in the field orthogonal transform mode, generation of block data for orthogonal transfer processing of all macro blocks in one frame as described above. Accordingly, the field orthogonal transfer mode data MDFD is outputted from the frame/field mode judgment circuit 33.

Any one of frame/field orthogonal transform mode data MDFM/MDFD outputted from the frame/field mode judgment circuit 33 and the coding mode data EN1/EN2 from the coding processing mode judgment circuit 34 are transmitted to the address generator 35 and the group of frame memories 20 with motion compensator. In addition, the orthogonal transform mode data (MDFM/MDFD), the motion predictive mode data (MPFM/MPFD), the coding mode data EN1/EN2, and the motion vector data (FMMV/FDMV) are sent also to the above-described variable length coding circuit 15.

The address generator 35 controls the group of frame memories 10. Namely, as described above, in the case of the first coding processing, the address generator 35 controls the group of frame memories 10 so as to output macro block data generated in correspondence with the mode (data MDFM/MDFD) for generating block data for orthogonal transform processing in the odd cycle. Further, in the case of the second coding processing mode, the address generator 35 controls the group of frame memories 10 so as to output macro block data generated in correspondence with the field orthogonal transform mode (data MDFD) in the odd cycle and the even cycle.

In other words, for example, in the case where the first coding processing mode is selected and the coding mode data EN1 is delivered to the address generator 35, if the orthogonal transform mode data is, e.g., data MDFM indicating DCT processing every frame, this address generator 35 controls the group of frame memories 10 so as to output macro block data in which even and odd lines are scanned one after another as shown in FIG. 5(B) (macro block data every frame in which odd and even fields are combined). Namely, in this case, the address generator 35 controls the group of frame memories 10 so that data of four blocks of 8 lines×8 pixels (macro blocks) obtained by dividing a macro block of 1~16 lines into a macro block of 1~8 lines and a macro block of 9~16 lines is outputted at a time.

In the case where the first coding processing mode is selected and the coding mode data EN1 is delivered to the address generator 35, if the orthogonal transform mode data is, e.g., data MDFD indicating DCT processing every field, the address generator 35 control the group of frame memories 10 so as to output macro block data in which even and odd lines are separately scanned as shown in FIG. 5(C) (macro block data every field comprised of the odd and even fields). Namely, the address generator 35 controls the group of frame memories 10 so that two blocks of 8 lines×8 pixels (macro blocks) are respectively outputted at a time in the odd and even fields obtained by dividing lines into first line, third line, fifth line, seventh line, ninth line, eleventh line, thirteenth line, and fifteenth line (respective lines of the odd field or the first field); and second line, fourth line, sixth line, eighth line, tenth line, twelfth line, fourteenth line, and sixteenth line (respective lines of the even field or the second field).

In addition, for example, in the case where the second coding processing mode is selected and coding mode data EN2 is delivered to the address generator 35, the address generator 35 control the group of frame memories 10 so as to output macro block data generated in correspondence with the field orthogonal transform mode in the odd cycle and the even cycle as described above. Namely, for a time period during which the second coding processing mode is selected, the address generator 35 controls the group of frame memories 10 so that two block data of 8×8 (only luminance component as described later) are outputted at a time. To speak in a practical sense, in the odd cycle, the address generator 35 controls the group of frame memories 10 so that macro block data of two blocks of 8×8 only in the odd field is outputted by one frame (one picture). In the subsequent even cycle, the address generator 35 controls the group of frame memories 10 so that macro block data of two blocks of 8×8 only in the even field are outputted by one frame (one picture).

Picture data outputted from the group of frame memories controlled by the address generator 35 in a manner as described above is subjected to DCT processing at the DCT circuit 13 as previously described. Namely, for example, in the case where the first coding processing mode is selected and the frame orthogonal transform mode is selected, this DCT circuit 13 carries out DCT processing at unit block of 8 pixels as shown in FIG. 5(B) referred to above. Further, for example, in the case where the first coding processing mode is selected and the field orthogonal transform mode is selected, the DCT circuit 13 carries out DCT processing at unit block of 8×8 pixels as shown in FIG. 5(C) referred to above. In addition, in the case where the second coding processing mode is selected, as described above, when the processing cycle is the odd cycle, only odd fields are subjected to DCT processing at unit block of 8×8; and when the processing cycle is the even cycle, only even fields are subjected to DCT processing at unit block of 8×8 only.

Further, motion predictive mode data MPFM/MPFD and orthogonal transform mode data MDFM/MDFD from the frame/field mode judgment circuit 33, motion vector data FMMV/FDMV selected at the selector 24, and coding mode data EN1/EN2 from the coding processing mode judgment circuit 34 are delivered also to the group of frame memories 20 with motion compensator. Accordingly, at the group of frame memories 20 with motion compensator, there is carried out a motion compensation corresponding to motion predictive mode data MPFM/MPFD in the motion prediction, orthogonal transform mode data MDFM/MDFD in the DCT processing and coding mode data EN1/EN2, and using the motion vector data FMMV/FDMV.

Figure 6:
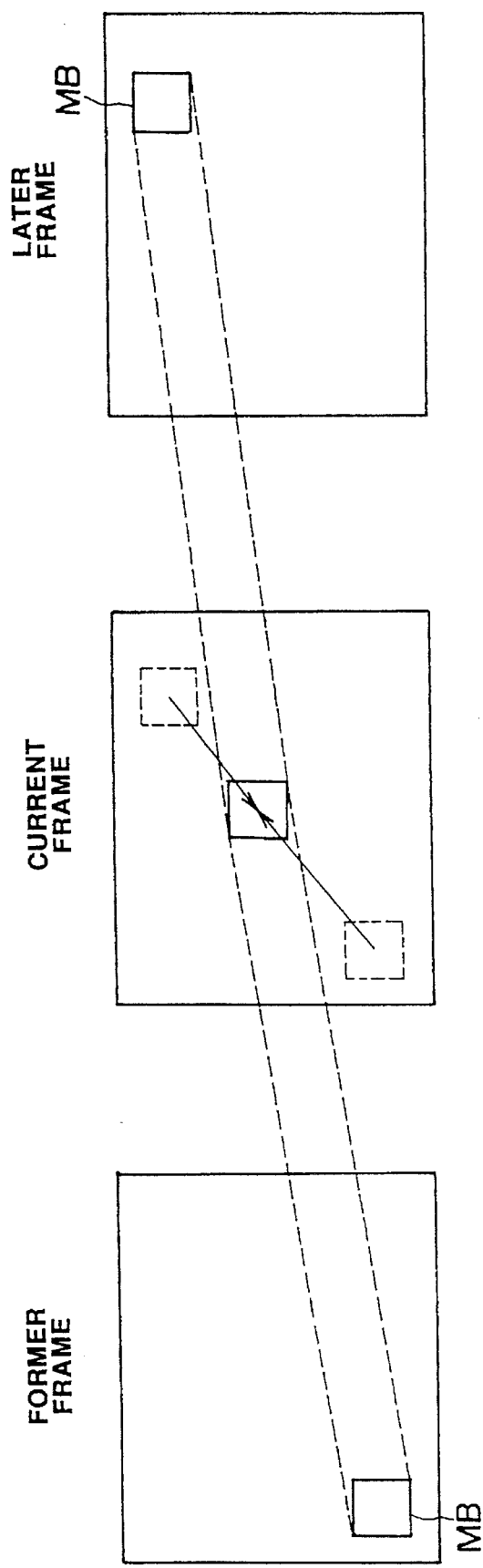
FIG. 6 is a view showing motion prediction in the case of the frame orthogonal transform mode in the first coding processing.

From facts as described above, the motion prediction of, e.g., P and B frames in the case of the first coding processing and the frame orthogonal transform mode is subjected to motion prediction from former and later frames as shown in FIG. 6. Accordingly, at the DCT circuit 13, a difference picture between an original picture and the predictive picture is subjected to DCT processing (subjected to DCT processing at unit block of 8×8 pixels). In FIG. 6, a former frame, a current frame and a later frame are shown, arrow indicates a motion vector, and MB indicates a macro block.

Figure 7:
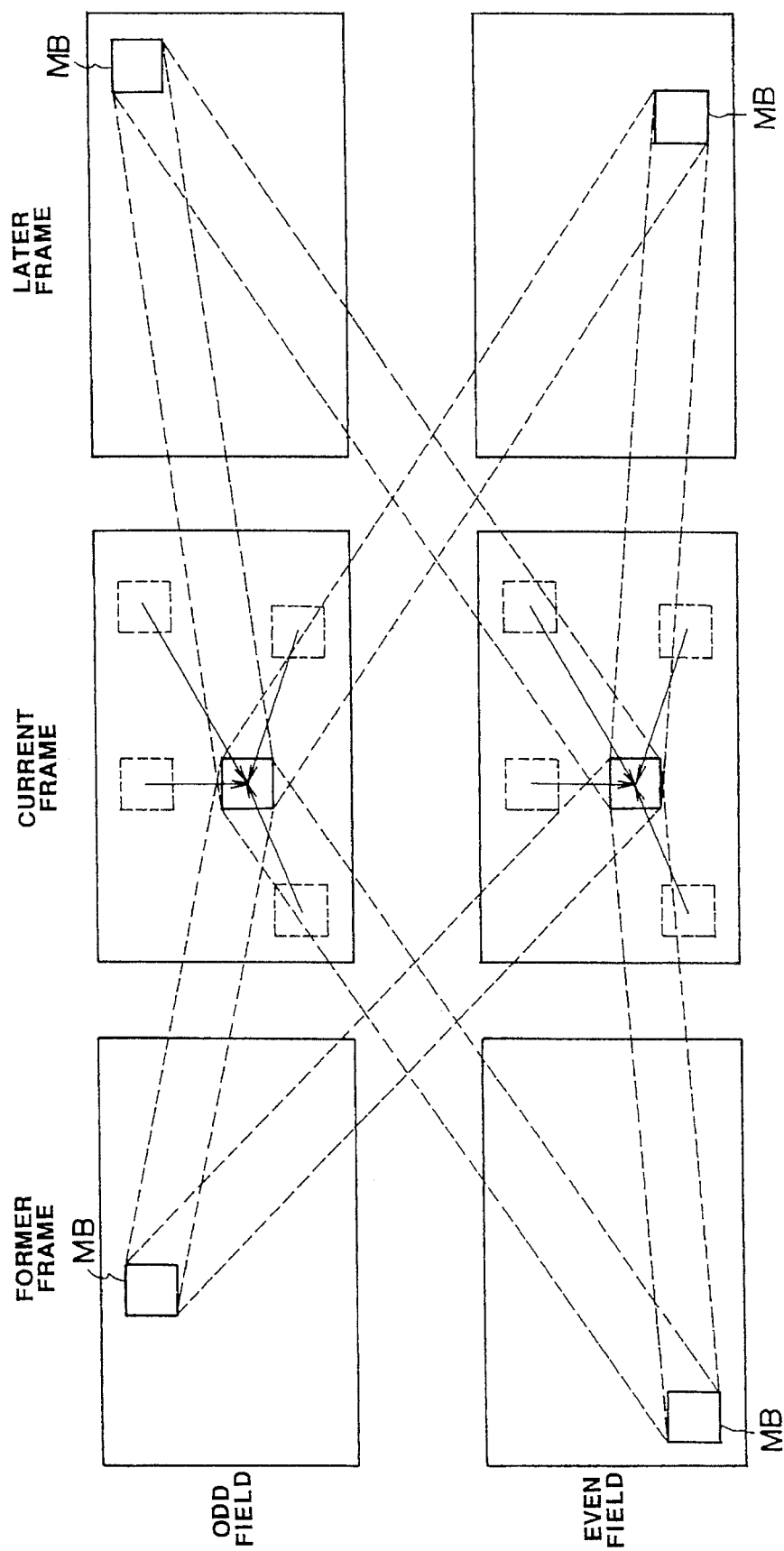
FIG. 7 is a view showing motion prediction in the case of the field orthogonal transform mode in the first coding processing.

Further, in the motion prediction of P and B frames in the case of the first coding processing mode and the field orthogonal transform mode, motion prediction is carried out from odd or even field (first or second field) of the former/later frames with respect to the odd and even fields of the macro block as shown in FIG. 7. Accordingly, at the DCT circuit 13, a difference picture between an original picture and the predictive picture is subjected to DCT processing (subjected to DCT processing at unit block of 8×8 pixels). In FIG. 7, an odd field and an even field of former, current and later frames are shown. In this figure, arrow indicates a motion vector, and MB indicates a macro block.

Figure 8:
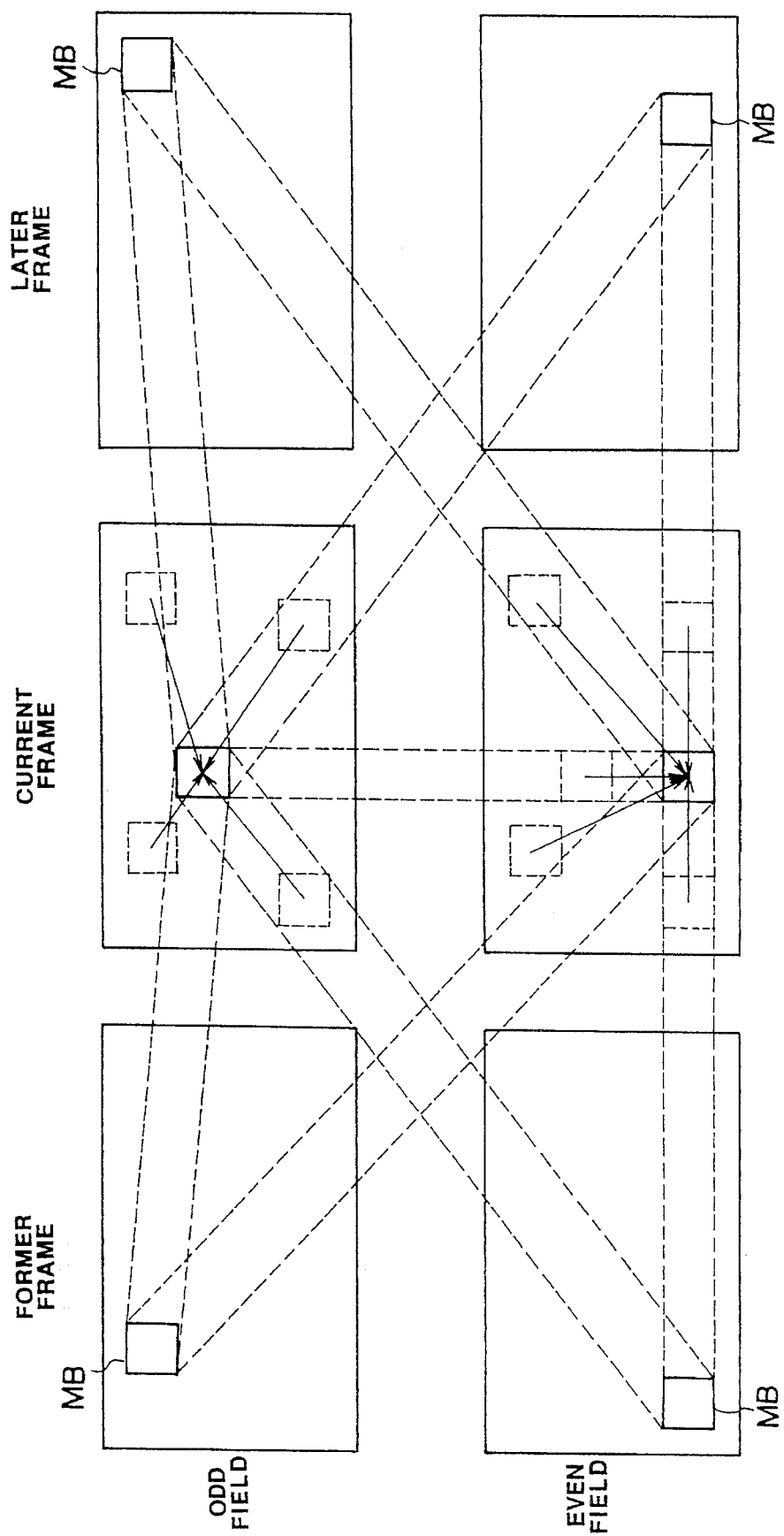
FIG. 8 is a view showing motion prediction in the case of the second coding processing mode.

Further, the motion prediction at the time of the field orthogonal transform mode in the case of the second coding processing mode is carried out as shown in FIG. 8, for example. Namely, motion prediction is carried out from odd or even fields of former/later frames with respect to odd and even fields of the macro block, and motion prediction between respective fields in each frame is also carried out. Accordingly, at the DCT circuit 13, a difference picture between an original picture and the predictive picture is subjected to DCT processing (subjected to DCT processing at unit block of 8×8 pixels). In FIG. 8, respective odd and even fields of former, current and later frames are shown. In this figure, arrow indicates a motion vector and MB indicates a macro block.

From facts as described above, in the efficient coding apparatus for a picture signal of the third embodiment, switching between coding in which interfield prediction in a frame is not carried out and coding in which interfield prediction in a frame is carried out is conducted in dependency upon the first or second coding processing mode (i.e., the quantity of movement of picture). Accordingly, coding having the highest efficiency can be made. Particularly, in the case of a frame in which movement is great, the second coding processing mode is effective.

Further, in this embodiment, with respect to one frame, coding processing is divided into the odd cycle of a time period during which scan of odd fields in an interlaced scan is carried out and the even cycle of a time period during which scan of even fields in the interlaced scan is carried out.

From facts as described above, as shown in FIG. 11, in the case of the motion prediction of P and B frames in the first coding processing mode, processing similar to that of the first embodiment is carried out.

Further, when the coding processing mode is the first coding processing mode, generation of block data for orthogonal transform processing of the B frame is carried out in the field orthogonal transform mode, and the motion prediction is carried out in the frame motion prediction mode, an approach is employed in the odd cycle to assume a reference picture to be pictures forward and backward in time to detect motion vectors between frames, i.e., a motion vector FMVB between the I frame and the B frame and a motion vector BMVB between the P frame and the B frame to select a prediction in which a predictive error between a reference frame and a current frame is minimum of the forward prediction, the backward prediction and the bidirectional prediction (average of the forward prediction and the backward prediction) to assume, as a predictive picture, the macro block constructed so that the odd field and the even field are separate with each other to encode a difference between the predictive picture and an original picture.

Moreover, when the coding processing mode is the first coding processing mode, generation of block data for orthogonal transform processing of the B frame is carried out in the field orthogonal transform mode, and the motion prediction is carried out in the field motion prediction mode, an approach is employed in the odd cycle to assume a reference picture to be pictures forward and backward in time to carry out prediction of the odd field and prediction of the even field with respect to these pictures to detect respective motion vectors, i.e., a motion vector FMVoBo between the Io field and the Bo field, a motion vector FMVeBo between the Ie field and the Bo field, a motion vector FMVoBe between the Io field and the Be field, a motion vector FMVeBe between the Ie field and the Be field, a motion vector BMVoBo between the Po field and the Bo field, a motion vector BMVeBo between the Pe field and the Bo field, a motion vector BMVoBe between the Po field and the Be field, and a motion vector BMVeBe between the Pe field and the Be field to select a prediction in which a predictive error between a reference frame and a current frame is minimum of the prediction of the odd field, the prediction of the even field, and the bidirectional prediction by respective vectors (average of the prediction of the even field and the prediction of the odd field) to assume, as a predictive picture, the macro block constructed so that the Io field and the Ie field (or the Po field and the Pe field) are separate with each other to encode a difference between the predictive picture and an original picture. On the other hand, no data is transmitted in the even cycle of this mode.

It is to be noted that, in the case of the first coding processing of this embodiment, similarly to the case of the first embodiment, the motion prediction between the Io field and the Ie field, the motion prediction between the Po field and the Pe field, and the motion prediction between the Bo field and the Be field cannot be carried out.

In this case, if the second coding processing mode of this embodiment is used, prediction from the odd field to the even field can be made in respective pictures.

Accordingly, in the case where the processing mode is the second coding processing mode and the orthogonal transform mode is the field orthogonal transform mode, an approach is employed to encode, in the odd cycle, only odd fields of macro block data, and to encode, in the even cycle, only even fields of macro block data. Thus, at the time point when, e.g., the above-mentioned odd cycle is completed, the entirety of the Io field is obtained on the decoder side which will be described later. Accordingly, in the even cycle of the I frame, with respecto to macro block data of the Ie field by the field orthogonal transform mode, as shown in FIG. 11, motion prediction is carried out by using the Io field as a reference picture, thus making it possible to encode that motion vector SMVI and a difference picture between an original picture and the predictive picture.

Further, as shown in FIG. 11, in the case of the P frame in the second coding processing mode, processing as described below will be conducted. For example, when the motion prediction mode of the P frame is the frame motion prediction mode, an approach is employed to detect a motion vector MVP between frames with a reference picture being as a picture forward in time (picture of I frame) after the odd cycle and the even cycle to assume, as a predictive picture, the macro block in which the Io field and the Ie field are combined to encode a difference between the predictive picture and an original picture.

When the coding processing mode is the second coding processing mode and the motion prediction of the P frame is carried out in the field motion prediction mode, an approach is employed in the odd cycle to detect a motion vector MVoPo between the Io field and the Po field and a motion vector MVePo between the Ie field and the Po field with the Io field and the Ie field being as reference pictures, respectively.

In the even cycle of this mode, an approach is employed to detect, with respect to macro block data of the field orthogonal transform mode, a motion vector MVoPe between the Io field and the Pe field, a motion vector MVePe between the Ie field and the Pe field, and a motion vector SMVP between the Po field and the Pe field to select a prediction in which a predictive error is minimum from the prediction of the odd field, the prediction of the even field and the prediction of the odd field of a current frame by respective vectors, and the prediction by an average of two predictions selected therefrom, thus to encode a difference between an original picture and the predictive picture.

Further, for example, when the coding processing mode is the second coding processing mode and the motion prediction of the B frame is carried out in the frame motion prediction mode, an approach is employed to detect a motion vector FMVB between the I frame and the B frame, and a motion vector BMVB between the P frame and the B frame to select a prediction in which a predictive error between a reference frame and a current frame is minimum of the forward prediction, the backward prediction, and the bidirectional prediction (average of the forward prediction and the backward prediction), thus to encode a difference between an original picture and the predictive picture.

When the coding processing mode is the second coding processing mode and the motion prediction of the B frame is carried out in the field motion prediction mode, an approach is employed in the odd cycle to assume a reference picture to be pictures forward and backward in time to carry out the prediction of the odd field and the prediction of the even field with respect to these pictures to detect respective motion vectors, i.e., a motion vector FMVoBo between the Io field and the Bo field, a motion vector FMVeBo between the Ie field and the Bo field, a motion vector BMVoBo between the Po field and the Bo field, and a motion vector BMVeBo between the Pe field and the Bo field.

The motion prediction in the first coding processing mode in the case of the example of FIG. 3 is as shown in FIG. 10(A) referred to above. Accordingly, in this case, as described above, it is sufficient to use the second coding processing mode.

In addition, also in this embodiment, in the case of handling digital VTR format of 4:2:2 component, the motion predictive processing of frame is carried out every macro block MB as shown in FIG. 14 referred to above in addition to processing as shown in FIG. 13 referred to above. On the other hand, in the case of carrying out motion prediction of field, an approach may be employed to combine macro blocks as a group to carry out motion prediction of the odd field and motion prediction of the even field with respect to the group of macro blocks MBg. Thus, in the case of the frame orthogonal transform mode, processing of respective macro blocks are not affected by the orthogonal transform mode of other macro blocks.

Figure 18:
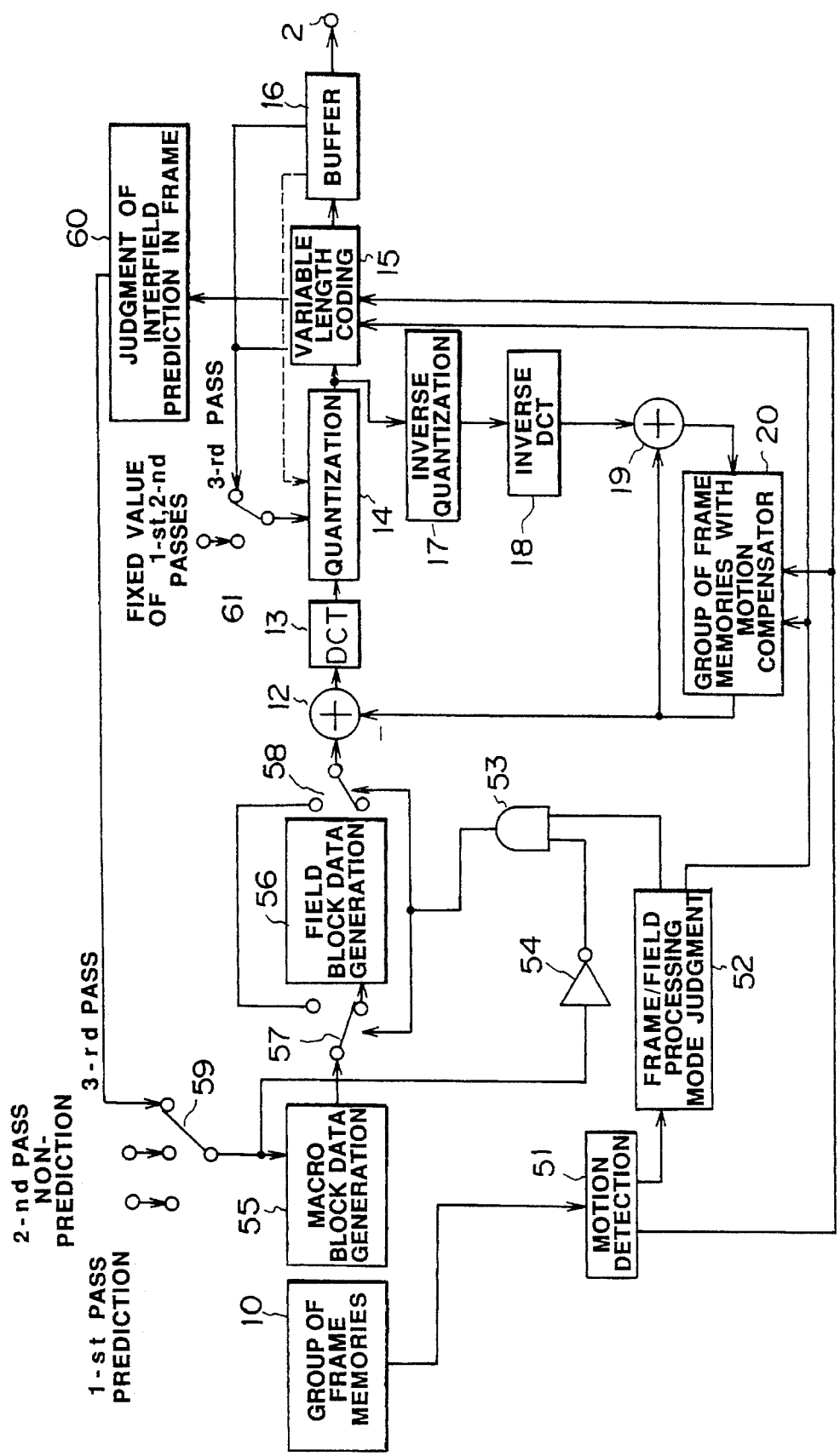
FIG. 18 is a block diagram showing the outline of the configuration of an efficient coding apparatus for a picture signal in a fourth embodiment.

An example of the configuration of a coding apparatus of a fourth embodiment is shown in FIG. 18. In FIG. 18, the same reference numerals are respectively attached to components similar to those of FIG. 1 referred to above, and their detailed explanation will be omitted.

Description of the Fourth Embodiment

The apparatus of the fourth embodiment is constructed as a coding apparatus by three passes wherein three times of processing are carried out for processing one frame.

Namely, in the apparatus of the fourth embodiment, at the first pass, processing of the second coding processing mode (mode having an interfield prediction in a frame) by the fixed quantization width is carried out; at the second pass, processing of the first coding processing mode (mode having no interfield prediction in a frame) by the fixed quantization width is carried out; and at the third pass, a processing having a lesser number of bits generated of the processing at the first and second passes is selected to carry out the selected processing so as to control the quantization width.

In the apparatus of the fourth embodiment, at the succeeding stage of the group of frame memories 10, a macro block data generator 55, a selector switch 57, a circuit 56 for transforming macro block data to field block data (hereinafter referred to as a field block data generator depending upon circumstances), and a selector switch 58 are inserted and connected. In addition, picture data from the group of frame memories 10 is sent to a motion detector 51 for carrying out frame and field motion detections. An output from the motion detector 51 is sent to a mode judgment circuit 52 for selecting frame/field mode in generation of block data for orthogonal processing and the motion prediction, the group of frame memories 20, and the variable length coding circuit 15.

Output mode data from the mode judgment circuit 52 is sent to the group of frame memories 20 and the variable length coding circuit 15, and field orthogonal transform mode data thereof is sent to one input terminal of a two-input AND gate 53. To the other input terminal of the two-input AND gate 53, an output of a selector switch 59 switched in dependency upon whether a current processing is processing of the first, second or third pass is delivered through an inverter 54. In addition, the output terminal of the two-input AND gate 53 is connected to switching control terminals of the selector switches 57, 58.

From the variable length coding circuit 15, data indicating the number of bits generated is outputted. This data indicating the number of bits generated is sent to a selection circuit (circuit for judging whether or not there is interfield prediction in a frame) 60 for selecting a mode of a lesser number of bits generated of the first and second coding processing modes on the basis of the data indicating number of bits generated, and to a buffer 16. Further, data of a quantity of storage from the buffer 16 is delivered to the variable coding circuit 15, and to one selected terminal of a selector switch 61. To the other selected terminal of this selector switch 61, fixed values of the first and second passes are delivered.

In such an apparatus of the fourth embodiment, picture data inputted to the terminal 1 is temporarily stored into the group of frame memories 10. From the group of frame memories 10, necessary frame or field data are read out. By using these picture data thus obtained, motion vectors are determined by the motion detector 51. The above-mentioned mode judgment circuit 52 carries out judgment of the mode of field/frame every macro block from a motion prediction residual from the motion detector 51. The macro block data generator 55 connected to the succeeding stage of the group of frame memories 10 receives information corresponding to processing of the first, second and third passes (i.e., information of presence/absence of interfield prediction in a frame which is the first coding processing mode or the second coding processing mode). When the macro block data generator 55 receives information of the second coding processing mode as the above information, it transmits only block data of the odd field (first field) thereafter to transmit block data of the even field (second field) to stop generation of block data in the frame orthogonal transform mode. In addition, in the case where picture data in which macro block data is caused to be block data in the frame orthogonal transform mode on the basis of information of the first coding processing mode at the macro block data generator 55 is judged to be data in the field mode at the mode judgment circuit: 52 from a residual from the motion detector 51, this data is transformed to block data in the field orthogonal transform mode at the circuit 56 for transforming input data into field block data.

At the processing of the first and second passes, coding is carried out by each fixed quantization width. At the selection circuit 60, comparison between respective quantities of bits generated is conducted. In dependency upon the comparison result, a mode of a lesser quantity of bits generated is selected every frame of the processing modes having interfield prediction in a frame and the processing having no such prediction. At the processing of the third pass, actual coding is carried out. To information of a mode selected at this time, 1 bit is added every frame.

As described above, in accordance with the efficient coding apparatus for a picture signal of this invention, even if, with respect to a moving picture of the field structure, a picture to be coded is a picture having small movement or a picture having great movement, or a picture in which such pictures are mixed, it becomes possible to efficiently implement field processing or frame processing thereto. Accordingly, it is possible to reproduce, with a lesser quantity of information transmitted, a moving picture of a high picture quality in decoding in the efficient decoding apparatus of this invention of which operation will be described in detail later.

Description of the Embodiment of Decoder

Figure 19:
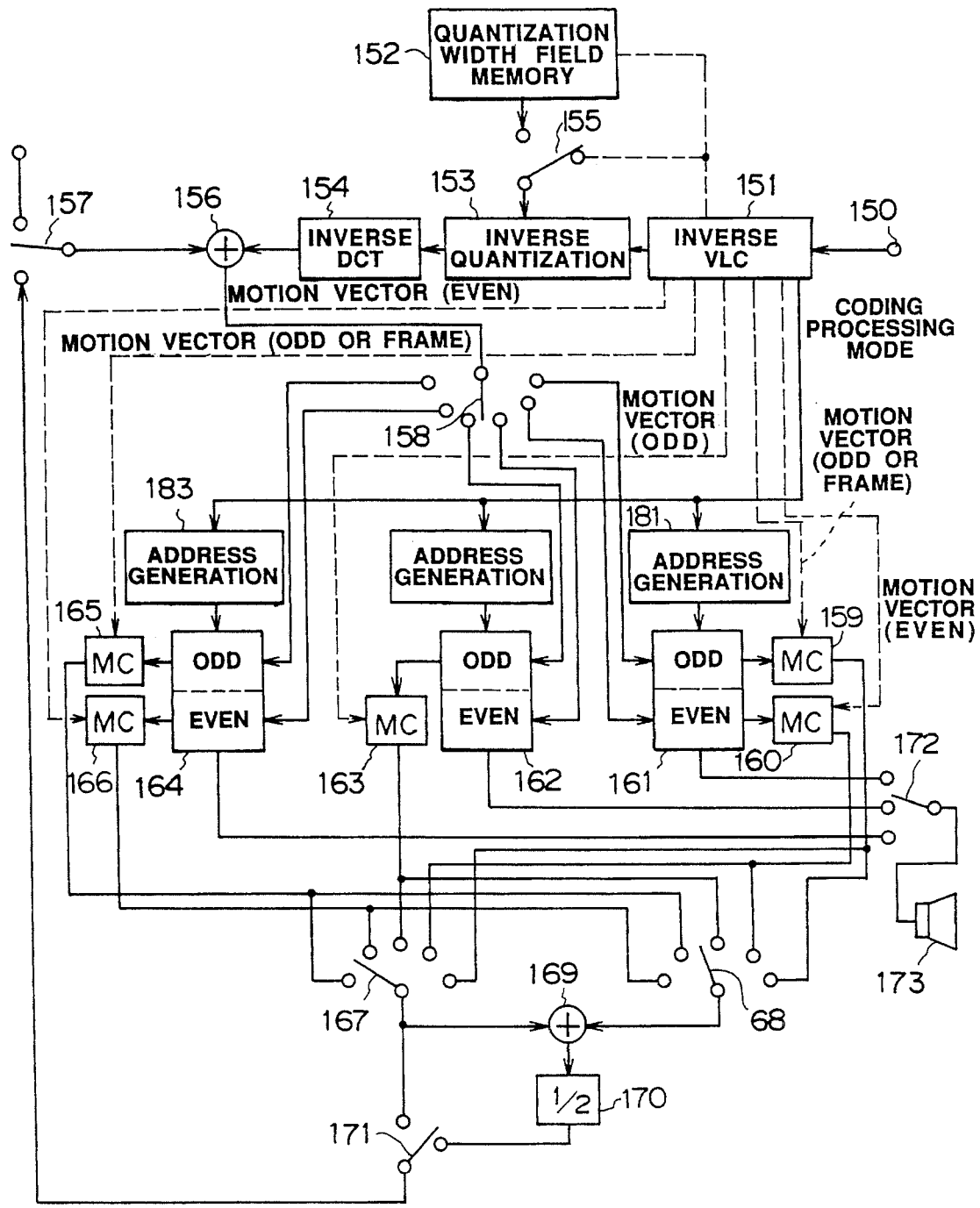
FIG. 19 is a block diagram showing the configuration of a decoder.

The block diagram of a decoder for a picture signal is shown in FIG. 19. Data coded by the above-mentioned coding apparatus is recorded onto a storage medium such as CD, etc. The coded data reproduced from such CD, etc. is first inputted to an inverse variable coding circuit 151 through an input terminal 50, at which header information, etc. is decoded every sequence, every frame group, and every frame. In the odd cycle of the frame, header information is decoded every slice (group of macro blocks), and the quantization width is included in the header information of this slice. Then, address data of the macro blocks, field orthogonal transform mode/frame orthogonal transform mode information, and macro block type data indicating a decoding system are decoded every macro block, and the quantization width is decoded in updating.

It is to be noted that generation of block data in the macro block is carried out in the frame orthogonal transform mode, the entirety of the macro block data is decoded in the odd cycle, whereas no data is decoded in the even cycle. In addition, in the case where generation of block data is carried out in the field orthogonal transform mode, only block data including odd fields of the macro block data is decoded in the odd cycle, and block data including even fields is decoded in the even cycle.

The picture information is decoded through an inverse quantizer 153 for carrying out an inverse quantization processing and an inverse DCT circuit 154 for carrying out an inverse DCT processing. The picture data thus decoded undergoes a processing for judging, in dependency upon the macro block type data, whether or not it is difference picture information. In dependency upon the judgment result, a mode switch 157 for carrying out switching between addition to a reference picture and no addition to the reference picture (corresponding to non-intra/intra of the MPEG coding) by an adder 156 is switched. In the case of the I frame and the P frame, the decoded picture data are respectively inputted (interchangeably every time the I frame and the P frame are processed) to frame buffers 164 and 161. On the other hand, in the case of the B frame, the decoded picture data are inputted to a frame buffer 162. In this embodiment, each frame buffer is comprised of two field buffers, and odd/even field picture data are separately stored into the respective field buffers. Additionally, writing into the frame buffer is controlled by switching of a switch 158.

At this time, an address to be written into the frame buffer is given by any one of address generator 81, 82 and 83. Each address generator calculates an address increment value at the frame buffer from macro block address increment data of the header information of the macro block to determine leading addresses of respective macro blocks data.

Further, data of each quantization width is stored into the memory 152 by one field, respectively. This quantization width data is sent to the inverse quantizer 153 through a switch 155 switched in dependency upon an output of the inverse variable coding circuit 151. In the even cycle, since only macro block data processed in the field orthogonal transform mode is decoded, macro block address data and macro block type data to be decoded every macro block and motion vectors required for a predictive system indicated by the macro block type data are decoded every field. Then, a difference picture further transmitted is added to a picture which has been motion-compensated from a reference field. Thus, a reproduced picture is obtained.

Data of the respective frame buffers 164, 162 and 161 are motion-compensated by the motion compensation processing circuits 165, 166, 159, 160 and 163. At this time, these respective motion compensation circuits carry out switching between motion compensation of frame and motion compensation of field by the block generation mode (frame/field) in the DCT processing.

The motion-compensated pictures are sent to respective selected terminals of selector switches 67, 68 and 71. These selector switches 67, 68 and 71 are switched so that a reference field or frame indicated by a decoding system of the macro block type is taken out. To the selector switch 71, a signal obtained by adding outputs of the selector switches 67 and 68 at an adder 69 to divide it by two at a divider 170 and an output of the switch 67 are delivered. An output of this switch 71 is sent to the switch 157.

Further, outputs of respective frame buffers 164, 161 and 162 are sent to a display 73 through a selector switch 72. To the display 73, an output of the selector switch 72 switched so that picture data are displayed in order of reproduced pictures in place of the order of decoded pictures is delivered. Thus, a pictorial image is obtained.

Figure 20:
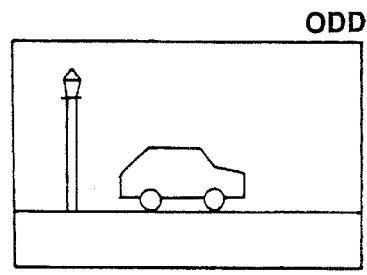
FIG. 20 is a view showing a picture in the odd cycle.
Figure 21:
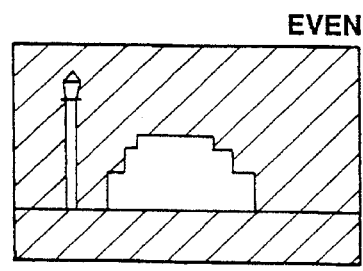
FIG. 21 is a view showing a picture in the even cycle.
Figure 22:
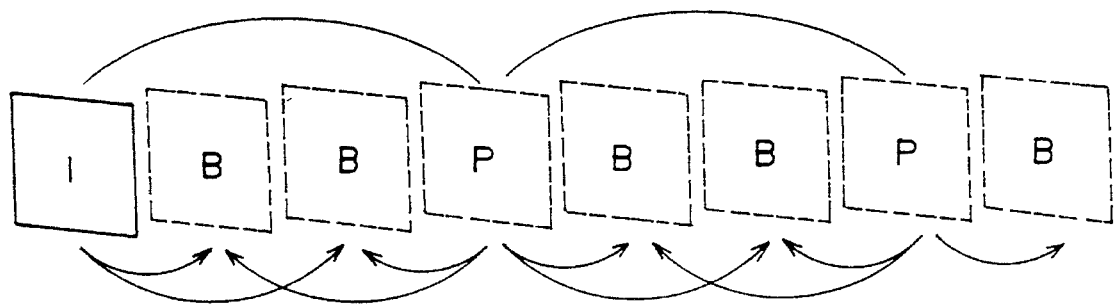
FIG. 22 is a view for explaining respective predictive pictures.
Figure 23:
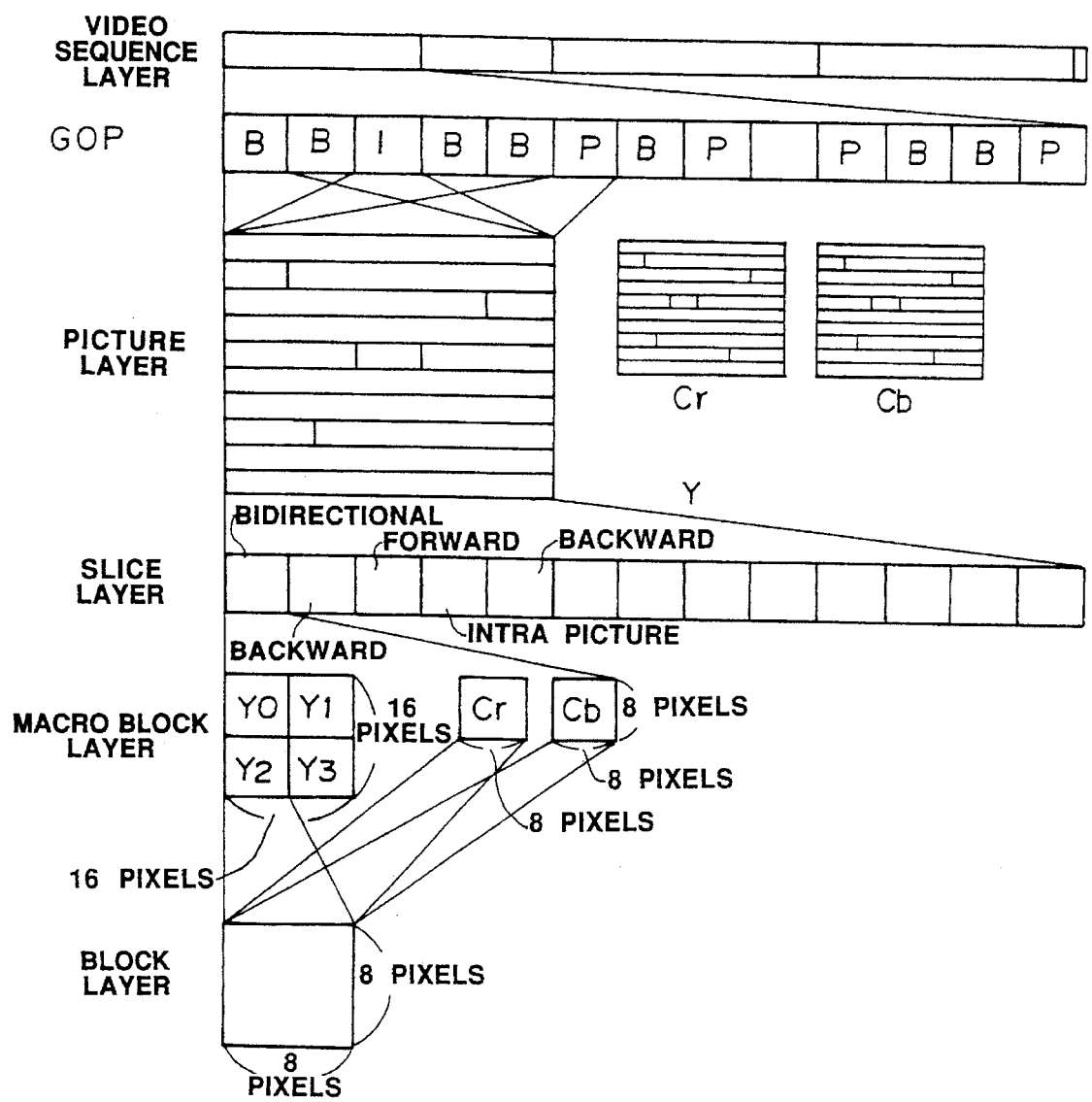
FIG. 23 is a view showing data structure.
Figure 24:
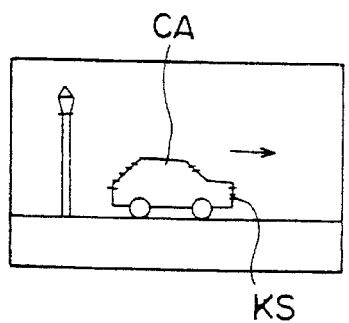
FIG. 24 is a view showing a certain picture of a moving body.

From facts as described above, in the case where there is a moving body CA on this side of a still background as described in FIG. 23 previously referred to, for example, there is any motion between fields when attention is drawn to one frame. For this reason, such a portion takes a comb form. On the contrary, in accordance with the apparatus of this embodiment, since such a moving portion is coded in the field orthogonal transform mode, it can be processed as a picture having no movement, which is divided every fields. By the motion compensation between odd/even fields, a moving picture of a high picture quality can be reproduced with high efficiency. Namely, as shown in FIG. 20, for example, when the processing cycle is the odd cycle, a moving portion is processed in the field orthogonal transform mode, and a still or stationary portion is processed in the frame orthogonal transform mode. It is to be noted that the portion where a picture has been already formed in the even cycle becomes the portion indicated by slanting lines in FIG. 21. Portions except for the portion indicated by slanting lines in FIG. 21, i.e., moving portions are decoded by the motion compensation.

Meanwhile, in this embodiment, since only macro block data processed in the field orthogonal transform mode is decoded in the even cycle, it is necessary to recognize a macro block address. There are two methods of recognizing a macro block address. One is a method of transmitting macro block address data every macro block in the even cycle as previously described. The other is a method of storing, by one field, information of field orthogonal transform mode/frame orthogonal transform mode in the odd cycle to obtain, by conversion, macro block address data which is in the field orthogonal transform mode from a train of respective processing mode information. The merit of the former is that supplement of any memory is unnecessary. On the other hand, the merit of the latter is that there is no increase in information transmitted. Recognition of the quantization width may be realized by transmitting such quantization width data every macro block without taking the method of storing them by one field in the odd cycle which has been already described.

From facts as described above, in accordance with the decoding apparatus of this embodiment, an approach is employed to divide the processing of one frame into an odd cycle and an even cycle to carry out, in the odd cycle, switching between the frame orthogonal transform mode and the field orthogonal transform mode every macro block, or to carry out, in the odd cycle, every macro block, switching between the frame orthogonal transform mode and the field orthogonal transform mode and also carry out between the frame motion prediction mode and the field motion prediction mode, in dependency upon the first or second processing mode; to both decode the odd field and the even field in the frame processing, and to decode only the odd field in the field processing to store a quantization width in the odd cycle to motion-compensate only macro block data in the field orthogonal transform mode by using the stored information in the subsequent even cycle. Accordingly, on the coding apparatus coded data can be efficiently transmitted. Namely, it is possible to reproduce a moving picture of a high picture quality by a lesser quantity of information transmitted.

We claim:

1. A high efficiency encoding method for a sequence of frame pictures, each frame picture being comprised of plural macroblocks, each of said frame pictures having a first field picture and a second field picture, comprising the steps of:

selecting either a first encoding mode or a second encoding mode on a frame picture basis;

when said first encoding mode is selected, carrying out orthogonal transform encoding of said plural macroblocks by adaptively selecting on a macroblock basis either a frame processing mode for orthogonally transforming a block comprised of a first field component and a second field component, or a field processing mode for orthogonally transforming a block comprised of either said first field component or said second field component; and when said second encoding mode is selected, carrying out orthogonal transform encoding of a block composed only of said first field component for one frame picture and then carrying out orthogonal transform encoding of a block composed only of said second field component for one frame picture so that said second field component of said block can be predicted by using said first field component of said block.

\* \* \* \* \*